(12) United States Patent
Ali

(10) Patent No.: US 10,044,098 B2
(45) Date of Patent: Aug. 7, 2018

(54) MODULAR BASE STATION

(71) Applicant: Facebook, Inc., Menlo Park, CA (US)

(72) Inventor: Kashif Ali, Emeryville, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/433,828

(22) Filed: Feb. 15, 2017

(65) Prior Publication Data

US 2017/0244158 A1 Aug. 24, 2017

Related U.S. Application Data

(60) Provisional application No. 62/297,779, filed on Feb. 19, 2016, provisional application No. 62/351,827, filed on Jun. 17, 2016.

(51) Int. Cl.
| | |
|---|---|
| *H04B 1/38* | (2015.01) |
| *H01Q 1/24* | (2006.01) |
| *H01Q 1/02* | (2006.01) |
| *H01Q 1/12* | (2006.01) |
| *H01Q 1/44* | (2006.01) |
| *H04B 1/3827* | (2015.01) |
| *H04W 8/20* | (2009.01) |
| *H04W 24/04* | (2009.01) |

(Continued)

(52) U.S. Cl.
CPC ............ *H01Q 1/246* (2013.01); *H01Q 1/02* (2013.01); *H01Q 1/1228* (2013.01); *H01Q 1/44* (2013.01); *H04B 1/3827* (2013.01); *H04W 8/20* (2013.01); *H04W 24/04* (2013.01); *H04B 2001/3894* (2013.01); *H04W 16/18* (2013.01); *H04W 88/10* (2013.01)

(58) Field of Classification Search
CPC ..... H04W 88/08; H04W 24/02; H04W 76/02; H02G 3/081; H02G 3/086; H02G 3/10; H02G 3/12; H02G 3/14; H02G 3/18; H05K 5/0221; H05K 5/0247; H05K 5/03; H05K 5/0004
USPC .................................. 455/550.1, 561, 575.8
See application file for complete search history.

(56) References Cited

U.S. PATENT DOCUMENTS

| | | | |
|---|---|---|---|
| 5,533,029 A * | 7/1996 | Gardner | ............... H04W 88/10 370/329 |
| D524,292 S | 7/2006 | Rak et al. | |

(Continued)

FOREIGN PATENT DOCUMENTS

| | | |
|---|---|---|
| WO | 0233786 A1 | 4/2002 |
| WO | 2014177930 A2 | 11/2014 |

OTHER PUBLICATIONS

U.S. Appl. No. 29/605,603 by Ali, K., et al., filed May 26, 2017.

(Continued)

*Primary Examiner* — Tu X Nguyen
(74) *Attorney, Agent, or Firm* — FisherBroyles, LLP

(57) ABSTRACT

Disclosed herein are embodiments including a modular base station that is, for example, easily deployable in emerging markets. The modular base station is designed to be easily transported and affixed, for example, to poles or trees. The modular base station is designed to withstand high temperatures caused by operating at high altitudes and to be easily configured, oriented, and serviced in the field. Its components (e.g., radio frequency (RF) circuit boards) are modular so as to interoperate with various third-party compatible devices.

20 Claims, 41 Drawing Sheets

(51) Int. Cl.
  *H04W 16/18* (2009.01)
  *H04W 88/10* (2009.01)

(56) References Cited

U.S. PATENT DOCUMENTS

| | | | |
|---|---|---|---|
| D538,245 S | 3/2007 | Heath | |
| D539,252 S | 3/2007 | Heath | |
| D656,478 S | 3/2012 | Barley et al. | |
| D660,827 S | 5/2012 | Sakata | |
| D668,239 S | 10/2012 | Marsh | |
| D679,676 S | 4/2013 | Sharp | |
| D721,349 S | 1/2015 | Konagata et al. | |
| D725,086 S | 3/2015 | Giczy | |
| D740,781 S | 10/2015 | Thomas | |
| D762,168 S | 7/2016 | Sandoval et al. | |
| D772,837 S | 11/2016 | Stabl et al. | |
| D789,361 S | 6/2017 | Putland et al. | |
| D791,767 S | 7/2017 | Ali et al. | |
| D798,296 S | 9/2017 | Ali et al. | |
| 2011/0309996 A1 | 12/2011 | Abumrad et al. | |
| 2016/0173672 A1* | 6/2016 | Boyce .................... | H04M 1/18 379/437 |

OTHER PUBLICATIONS

U.S. Appl. No. 29/605,610 by Ali, K., et al., filed May 26, 2017.
U.S. Appl. No. 29/608,450 by Ali, K., et al., filed Jun. 21, 2017.
U.S. Appl. No. 29/608,452 by Ali, K., et al., filed Jun. 21, 2017.
Corrected Notice of Allowability dated May 1, 2017 for U.S. Appl. No. 29/568,469, by Ali, K. et al., filed Jun. 17, 2016.
Corrected Notice of Allowability dated May 3, 2017 for U.S. Appl. No. 29/568,468, by Ali, K. et al., filed Jun. 17, 2016.
Notice of Allowance dated May 5, 2017, for U.S. Appl. No. 29/555,287 by Ali, K. et al., filed Feb. 29, 2016.
"And Now Facebook is in the base station business with OpenCellular," telecomasia.net, Jul. 8, 2016, 3 pages, found online [Nov. 21, 2016] http://www.telecomasia.net/blog/content/and-now-facebook-base-station-business-opencellular.
U.S. Appl. No. 29/555,287 by Ali, K., et al., filed Feb. 19, 2016.
U.S. Appl. No. 29/568,469 by Ali, K., et al., filed Jun. 17, 2016.
U.S. Appl. No. 29/568,468 by Ali, K., et al., filed Jun. 17, 2016.
Non-Final Office Action dated Jan. 9, 2017, for U.S. Appl. No. 29/555,287 by Ali, K. et al., filed Feb. 29, 2016.
Notice of Allowance dated Feb. 1, 2017 for U.S. Appl. No. 29/568,469, by Ali, K. et al., filed Jun. 17, 2016.
Corrected Notice of Allowability dated Mar. 23, 2017 for U.S. Appl. No. 29/568,469, by Ali, K. et al., filed Jun. 17, 2016.
Notice of Allowance dated Mar. 15, 2017 for U.S. Appl. No. 29/568,468, by Ali, K. et al., filed Jun. 17, 2016.
Corrected Notice of Allowability dated Aug. 22, 2017 for U.S. Appl. No. 29/555,287 by Ali, K., et al., filed Feb. 19, 2016.
Partial European Search Report dated Jul. 12, 2017 for European Patent Application No. 17156711.8 by Facebook, Inc.
Extended European Search Report dated Oct. 30, 2017 for European Patent Application No. 17156711.8 by Facebook, Inc.
U.S. Appl. No. 29/618,740 by Ali, K., et al., filed Sep. 22, 2017.

* cited by examiner

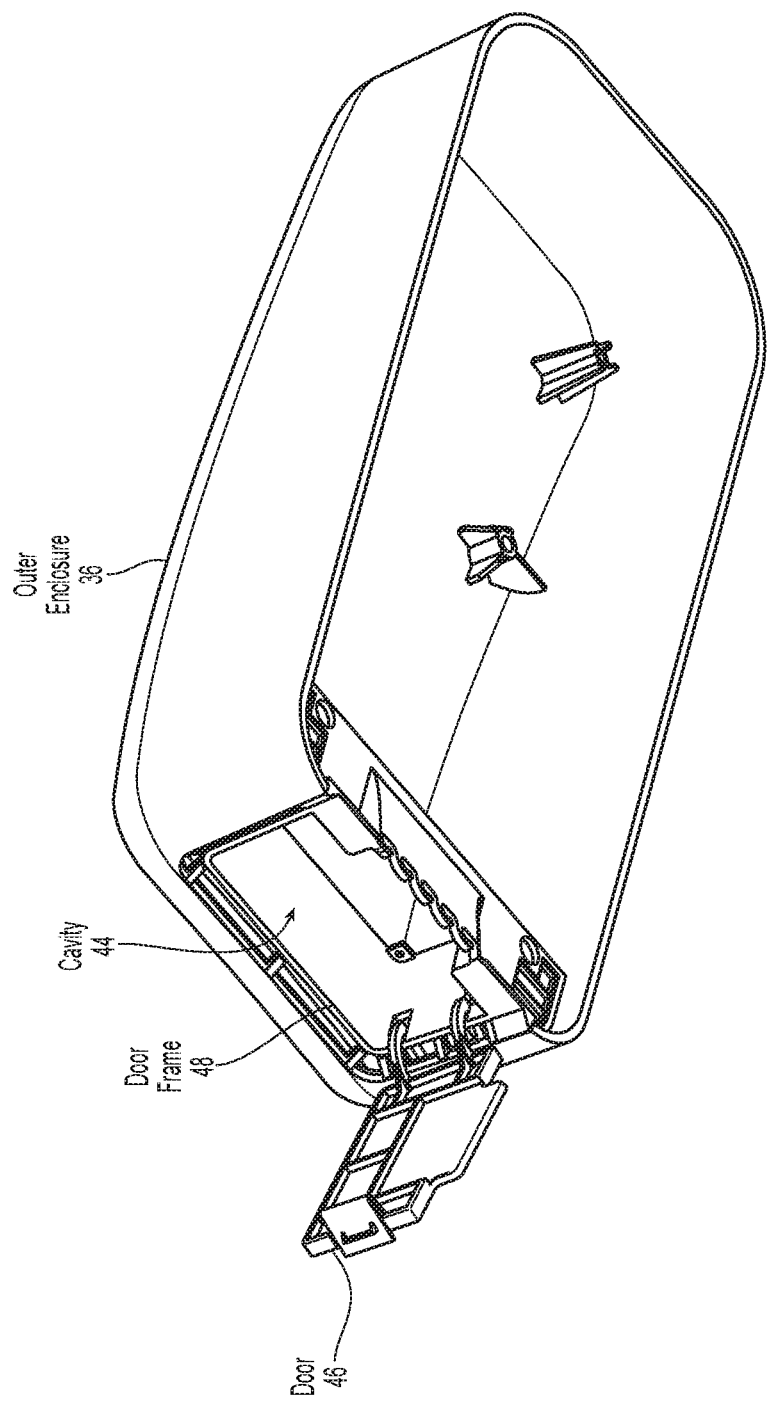

| POWER SOURCE | | | | BATTERY under CHARGE | | RAIL FEEDING LOAD |
|---|---|---|---|---|---|---|
| AUX DC | Solar | PoE | External Battery | Internal Battery | External battery (Sealed lead acid) | Internal Battery (Lithium polymer) | Priority |
| Y | | | | | | | AUX DC |
| Y | | Y | | | Y | | AUX DC |
| Y | | Y | | | Y | | AUX DC |
| Y | | | Y | | | | AUX DC |
| Y | | | | Y | | Y | AUX DC |
| Y | | Y | Y | | Y | | AUX DC |
| Y | | Y | | Y | | Y | AUX DC |
| Y | | Y | Y | Y | | Y | AUX DC |
| | Y | | | | Y | | Solar |
| | Y | Y | | | Y | | Solar |
| | Y | Y | | | | | Solar |
| | Y | | Y | | | Y | Solar |
| | Y | | | Y | Y | | Solar |
| | Y | Y | Y | | Y | Y | Solar |
| | Y | Y | | Y | | Y | Solar |
| | Y | Y | Y | Y | | Y | Solar |
| | | Y | | | N | | PoE |
| | | Y | | | N | | PoE |
| | | Y | Y | | | Y | PoE |
| | | Y | | Y | | | PoE |
| | | | Y | | | | Ext Bat |
| | | | Y | Y | | Y | Ext Bat |
| | | | | Y | | | Int Bat |

*Fig. 29*

MODULAR BASE STATION

CROSS-REFERENCE TO RELATED APPLICATIONS

The present application claims the benefit of commonly assigned U.S. Provisional Application No. 62/297,779, filed on Feb. 19, 2016, entitled "MODULAR BASE STATION," and U.S. Provisional Application No. 62/351,827, filed on Jun. 17, 2016, entitled "MODULAR BASE STATION," both of which are hereby incorporated by reference in their entireties.

TECHNICAL FIELD

The disclosed teachings relate to a communications network base station. The disclosed teachings more particularly relate to systems, devices, and methods related to a base station that has modular elements.

BACKGROUND

Many households around the world, including in emerging markets, own mobile phones commonly referred to as "feature phones," which are a class of low-end mobile phones that have limited capabilities in contrast to modern "smartphones." Feature phones typically provide voice calling and text messaging functionality but lack modern network connectivity (e.g., Internet) capabilities. In contrast, smartphones can include advanced mobile operating systems that combine features of personal computer operating systems with advanced network connectivity features for mobile or handheld use. Some feature phones allow for basic multimedia and Internet capabilities, and may even incorporate support for 3G connectivity, touchscreens, and access to popular social networking services.

Feature phones are marketed as a lower-cost alternative to smartphones, especially in emerging markets. In recent years, manufacturers have begun to produce and sell low-cost smartphones in an effort to tap into markets where adoption of high-end smartphones has been low. However, even though these phones may support features such as limited Internet capabilities, the infrastructure (e.g., ground base stations) to support these more advanced capabilities is, for the most part, absent from these markets. Moreover, installing conventional infrastructures remains cost prohibitive. Consequently, billions of people lack access to modern network technologies such as the Internet. Moreover, in some markets, it is cost prohibitive to install ground-based copper or other wiring and so these markets are suited for moving directly to cellular communications. In cellular communications, a base station typically provides wireless access using various protocols (e.g., LTE, GSM, Wi-Fi) to customer equipment (e.g., cellular telephones). Accordingly, a need exists for systems, devices, and methods for cost-efficient base stations.

BRIEF DESCRIPTION OF THE DRAWINGS

FIGS. 15A and 15B are enlarged partial isometric views showing a front cavity of the MBS formed from the outer enclosure, the door frame, and the door, shown removed from the MBS according to some embodiments of the present disclosure;

FIG. 29 is a table that represents rules for switching between power sources to feed a load and charge the internal and external batteries according to some embodiments of the present disclosure;

DETAILED DESCRIPTION

Figure 1:
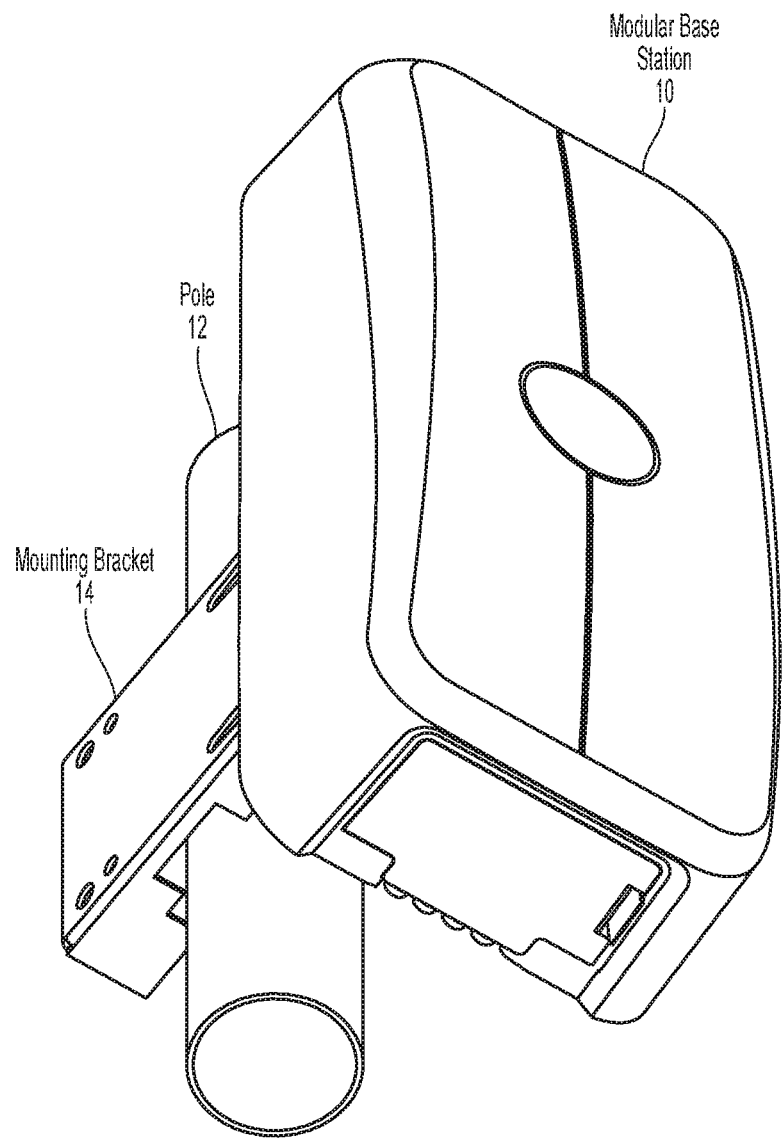
FIG. 1 shows the front and top of the modular base station (MBS) in accordance with an embodiment of the present technology, wherein the MBS is shown mounted to an external pole.

Disclosed herein are embodiments including a modular base station (hereinafter "MBS") that is, for example, easily and quickly deployable in a cost-effective manner. The MBS is designed to be easily transported and affixed, for example, to poles, trees, or other suitable support structures. The MBS may be designed to withstand extreme environmental conditions, such as high temperatures that can occur when the MBS is operating at high altitudes, and to be easily configured, oriented, and serviced in the field by a non-technical person (hence, it may require near-zero management).

The components of the MBS can include a general-purpose and baseband computing (GBC) component and a radio frequency (RF) component with integrated analog front-end for GSM and LTE. The components of the MBS can be modular so as to interoperate with various third party compatible devices. In addition to its functionality, the MBS can have an aesthetically pleasing ornamental appearance, such as is disclosed in commonly assigned U.S. Design patent application No. 29/555,287, titled Communications Base Station, filed concurrently herewith, and which is incorporated herein in its entirety by reference thereto.

In some embodiments, the MBS is low-cost, low-power and easy-to-manage cellular access point (e.g., a "network-in-a-box"). The MBS may support, for example, LTE or GSM (SMS/voice/GPRS/Edge) for rural settings (e.g., emerging markets). Moreover, it has a modular design which can support a 1/2/4 Transceiver (TRX) in quad-band fashion, in multiple configurations. Further, the MBS can support various deployment scenarios, including (i) network-in-a-box, (ii) remote radio head (RRH), (iii) small cell with centralized core, and so forth. For the GSM stack, the disclosed technology can support/run either closed source or open source (e.g., Osmo/OpenBTS). The MBS can also be configured to support 3G/LTE for a number of users (e.g., a maximum of 32 users).

As detailed below, the disclosed technology can improve network access for rural communities and can be operated by a local user who has no specialized technical skills in operating or configuring communications equipment. The MBS may be designed to be durable under various circumstances. For example, in particular embodiments, the MBS includes a multi-enclosure structure that protects sensitive internal electronics from the elements and other harsh conditions, while maintaining the flexibility of a modular design. In addition, the MBS can use different power supplies and can automatically switch from one power supply to another to provide an uninterrupted power supply. The disclosed technology may also include a mounting bracket that allows the MBS to be easily attached to a mounting structure, such as a pole, post, rail, tree, or other suitably stable support member.

The MBS can include antennas that can change between omni-directional and directional configurations by simply adjusting a metal plate. In addition, in some embodiments, a Base Station System (BSS) of the MBS is quad-band and may use redundancy of power amplifiers to provide uninterrupted service while remaining flexible. Also, the MBS may include out-of-band control channels (OOBCCs) to allow access to an MBS remotely from anywhere. The disclosed technology also includes "clocking" to take in GPS input and other data to generate useful information. Lastly, the disclosed technology includes mechanisms for maintaining a reliable and uniform system of MBSs by providing, for example, mechanisms to synchronize the MBSs with each other and cloud-based (e.g., Internet) servers or services.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like refer to actions and processes of a computer or similar electronic computing device that manipulates and transforms data represented as physical (electronic) quantities within the computer's memory, or registers into other data similarly represented as physical quantities within the computer's memory, registers, or other such storage medium, transmission, or display devices.

As used herein, the terms "connected," "coupled," or variants thereof, mean any connection or coupling, either direct or indirect, between two or more elements. The coupling or connection between the elements can be physical, logical, or a combination thereof.

Figure 2:
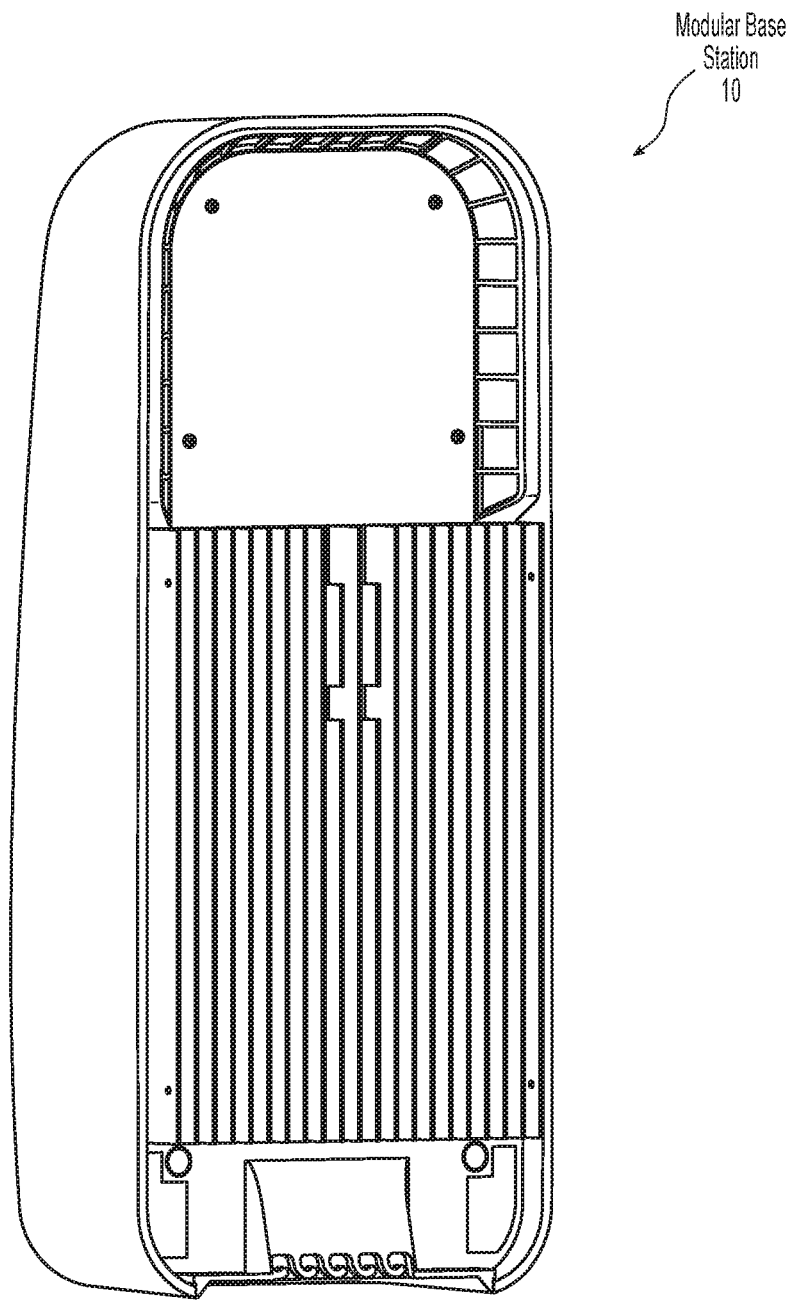
FIG. 2 shows the bottom of the MBS of FIG. 1 shown removed from the pole according to some embodiments of the present disclosure.
Figure 3:
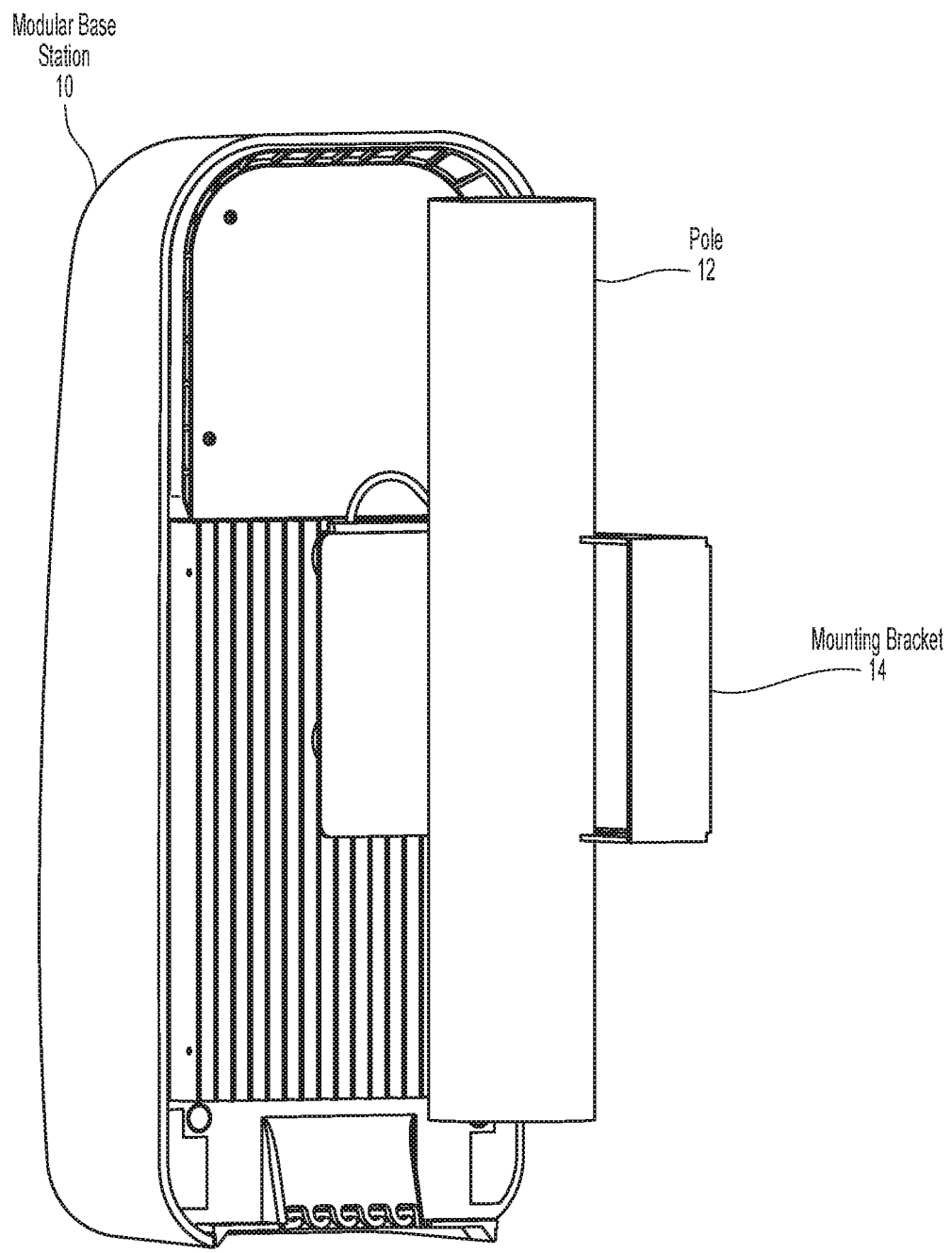
FIG. 3 shows the bottom of the MBS of FIG. 2 shown mounted to a pole according to some embodiments of the present disclosure.

FIG. 1 shows an example of the front and top of an MBS 10 mounted to a pole 12, which is external to the MBS 10. FIG. 2 shows an example of the bottom of the MBS 10 removed from the pole 12. FIG. 3 shows an example of the bottom of the MBS 10 illustrated in FIG. 2 mounted to the pole 12. As shown, the MBS 10 is a physical device that a person in the field could install to provide, for example, VoIP services to people in a region covered by the MBS 10 (e.g., a region within wireless communication range of the MBS 10).

Figure 4A:
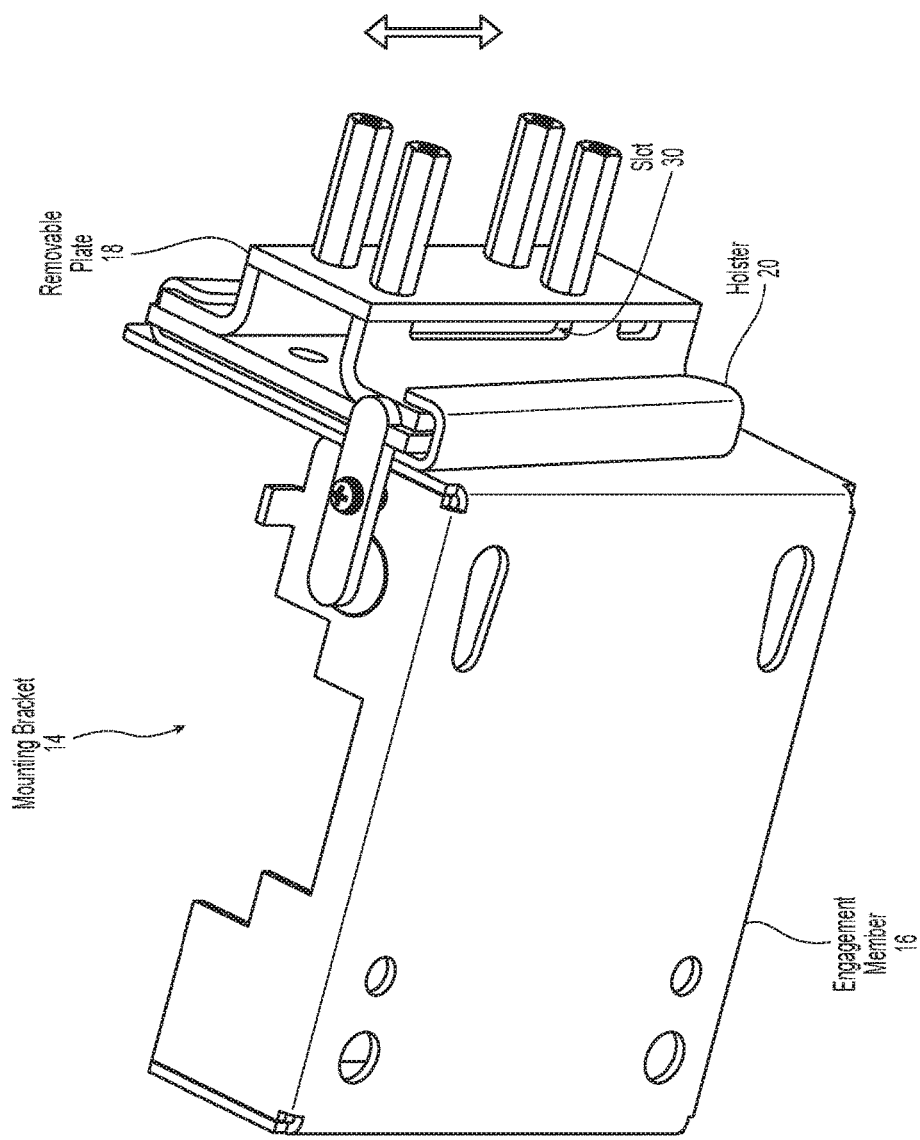
FIGS. 4A and 4B show a mounting bracket of FIG. 1 shown removed from the body of the MBS and configured for securing the MBS to a pole or other mounting structure according to some embodiments of the present disclosure.
Figure 4B:
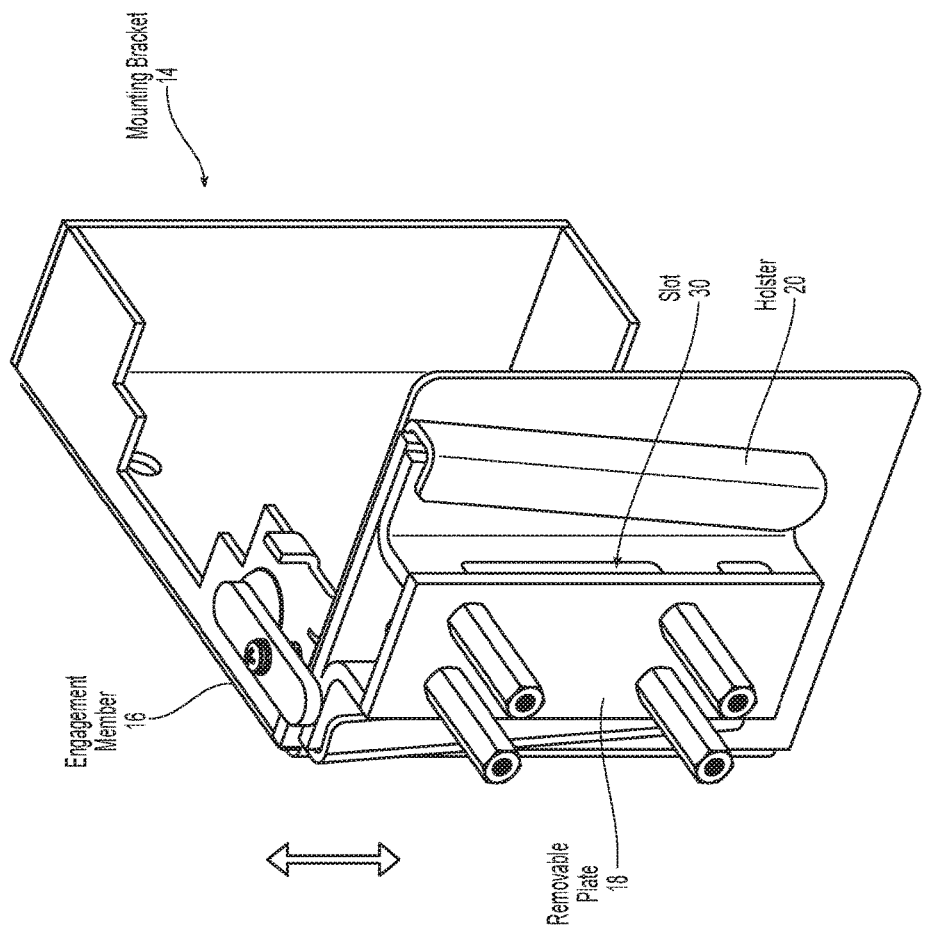

The MBS 10 of some illustrated embodiments also utilizes a mounting structure (e.g., mounting bracket 14) attachable to pole 12 or other support structure and adapted for quick and easy attachment of the MBS 10 to the support structure. For example, FIGS. 4A and 4B show an example mounting bracket 14 for securing the MBS 10 to a support structure such as a 2-4" mounting pole). The illustrated mounting bracket 14 has two sides that form a 90° angle. The bracket is formed of two separate pieces: an engagement member 16 that attaches to the pole 12, and a separate plate 18 that securely attaches to the MBS 10 and removably attaches to a holster portion 20 of the engagement member 16.

The removable plate 18 can include screw mounts or other suitable fasteners used to attach the plate 18 to the MBS 10. The removable plate 18 then may slide into (or out of) the mounting bracket 14's holster 20 in the directions of the arrow shown on FIGS. 4A and 4B. Accordingly, the MBS 10 is movable between installed and removed positions relative to the engagement member 16 and the pole 12 or other support structure by sliding the removable plate 18 attached to the MBS 10 into or out of the holster 20, respectively. As such, the mounting bracket 14 can easily be attached to a pole 12, and the MBS 10 can easily be attached to the mounting bracket 14. Moreover, the mounting bracket 14 allows for one-handed installation. In addition, in some embodiments the bracket 14 is durable such that it can, for example, sustain at least a Category 5 hurricane.

Figure 5A:
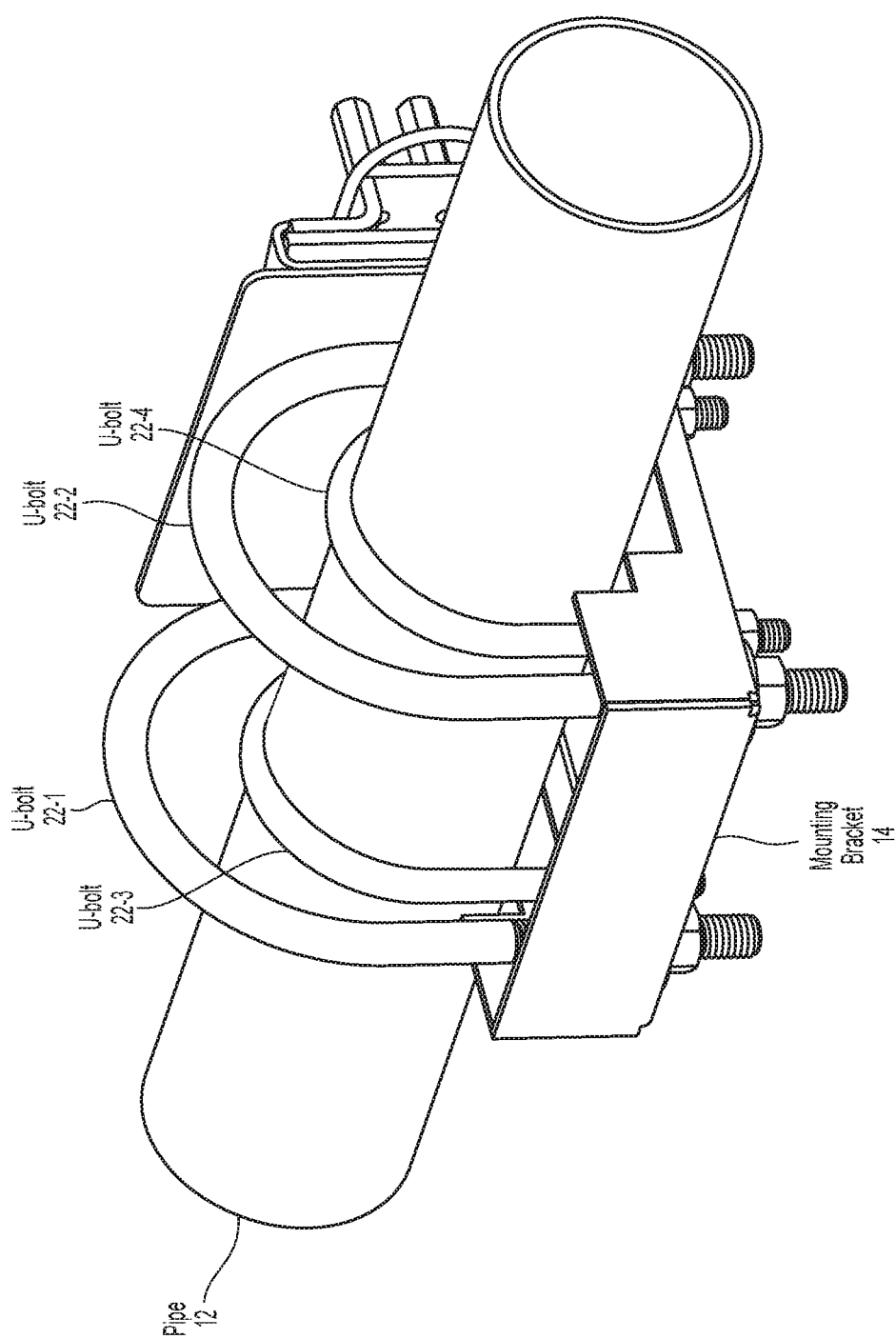
FIGS. 5A and 5B show the mounting bracket mounted to a pole according to some embodiments of the present disclosure.
Figure 5B:
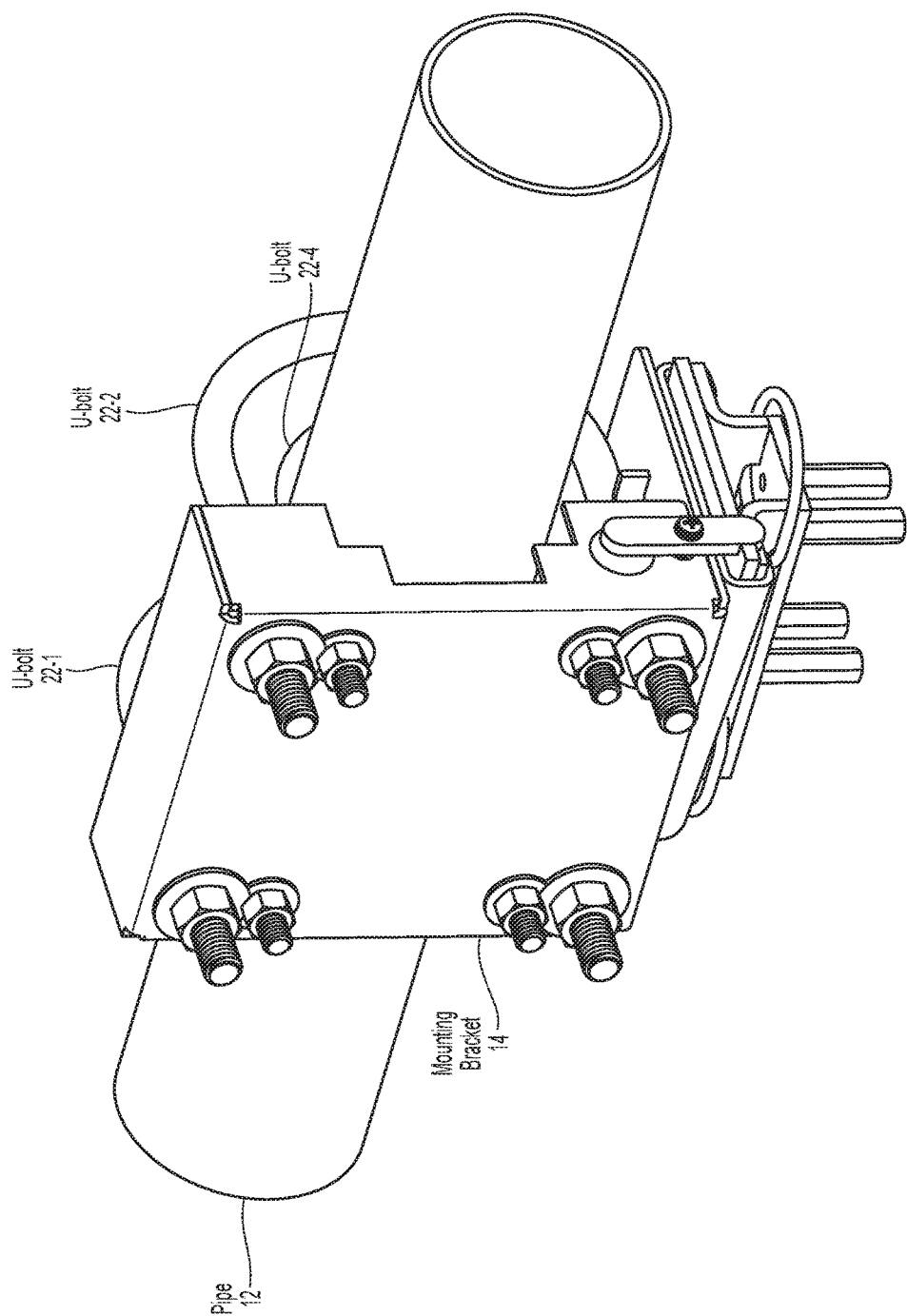

FIGS. 5A and 5B show an example embodiment of the mounting bracket 14 mounted to the pole 12. As shown, four U-bolts 22 are used to attach the mounting bracket 14 to the pole 12. The 90° angle of the bracket 14 allows a user to easily tighten the U-bolts 22 while facing the side of the bracket 14 that accepts the MBS 10.

Figure 6:
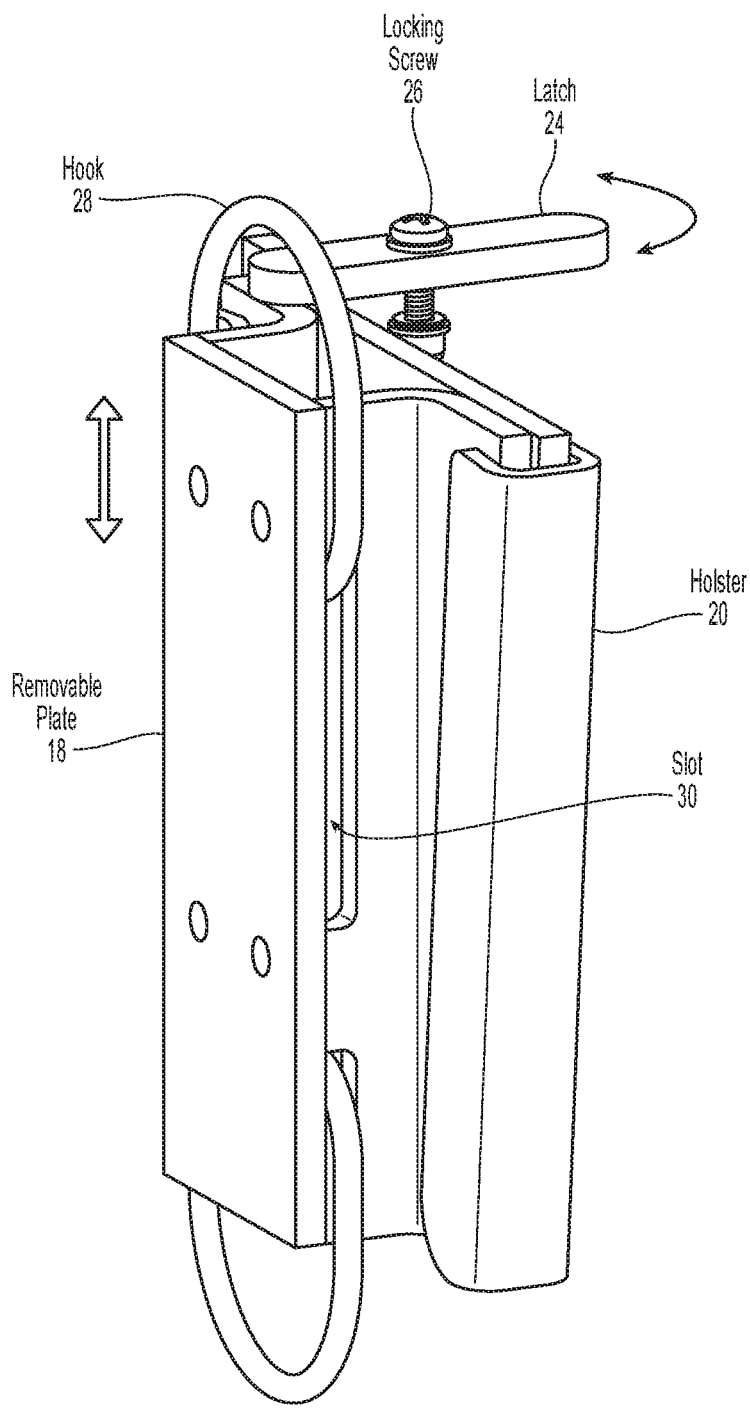
FIG. 6 shows a mechanism used to secure a removable plate to the mounting bracket according to some embodiments of the present disclosure.

FIG. 6 shows an example mechanism used to secure a removable plate 18 to the mounting bracket 14. As shown, a latch 24 is used to releasably retain the removable plate 18 in the holster 20 of the mounting bracket 14, thereby securely retaining the associated MBS 10 in the installed position on the mounting bracket 14. In one embodiment, the latch 24 is moved relative to the holster 20 to an unlatched position, whereby the latch 24 does not interfere with the removable plate 18 sliding into the holster 20. The latch 24 may be rotated in the direction of the curved arrow to a latched position (as seen in FIG. 6) so the latch 24 is immediately adjacent to the removable plate 18 and in an orientation that physically blocks the plate 18 from sliding out of the holster 20. The latch 24 can be spring loaded or otherwise biased toward the latched position. The mounting bracket 14 can include a locking screw 26 attached to the latch 24 and configured to be tightened to engage the end of the holster 20 and securely retain and lock the removable plate 18 in the installed position.

The removable plate 18 of the illustrated embodiment includes a handle member, such as one or more hooks 28 that a user can grasp to provide leverage for moving the removable plate 18 and MBS 10 between the removed and installed positions by pulling or pushing on the hooks 28, thereby sliding the plate 18 in and out of the holster 20. The hooks 28 can be of any size to serve a variety of purposes. For example, larger hooks could facilitate carrying the MBS 10 and/or could be used as a stand for the MBS 10 to sit atop a flat surface. As such, a hook could bear the weight of the MBS 10. Alternatively, a strap (not shown) could be used to pass through smaller hooks such that the strap could be used to carry the MBS 10. As shown, the hooks 28 are secured to the removable plate through one or more slots 30.

The slots 30 may serve multiple purposes as well. For example, the slots 30 can be used to attach the MBS 10 to a support structure of any suitable size (e.g., a large tree). In particular, in some embodiments, the removable plate 18 includes one or more slots 30 that can accept a strap. As such, the removable plate 18 can be fastened to an object of any suitable size or shape with a strap passing through the slots 30 of the removable plate 18. In addition, a strap can be used to carry the plate 18 and associated MBS 10 when an operator is climbing the pole 12. Moreover, the slots 30 provide a redundant mechanism to secure the MBS 10 to the pole 12 in addition to using the mounting bracket 14. The MBS 10 can be attached to a flat surface by screwing the holster 20 to the flat surface. In at least one embodiment, the removable plate 18 can be fixed directly to the flat surface or other mounting structure and then the MBS 10 can be connected to the removable plate 18.

Figure 7A:
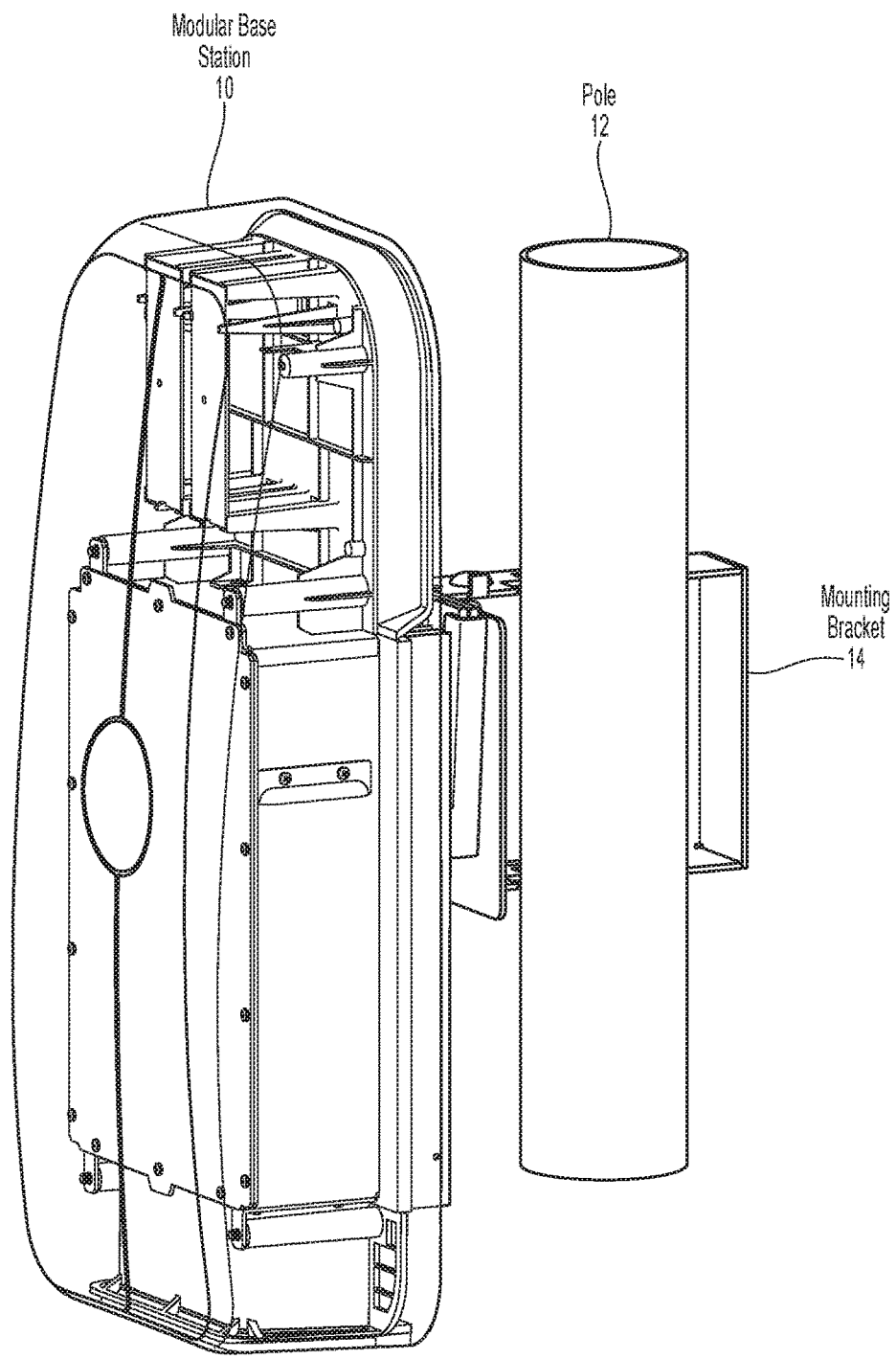
FIGS. 7A through 7C show semi-transparent views of the MBS mounted to a pole according to some embodiments of the present disclosure.
Figure 7B:
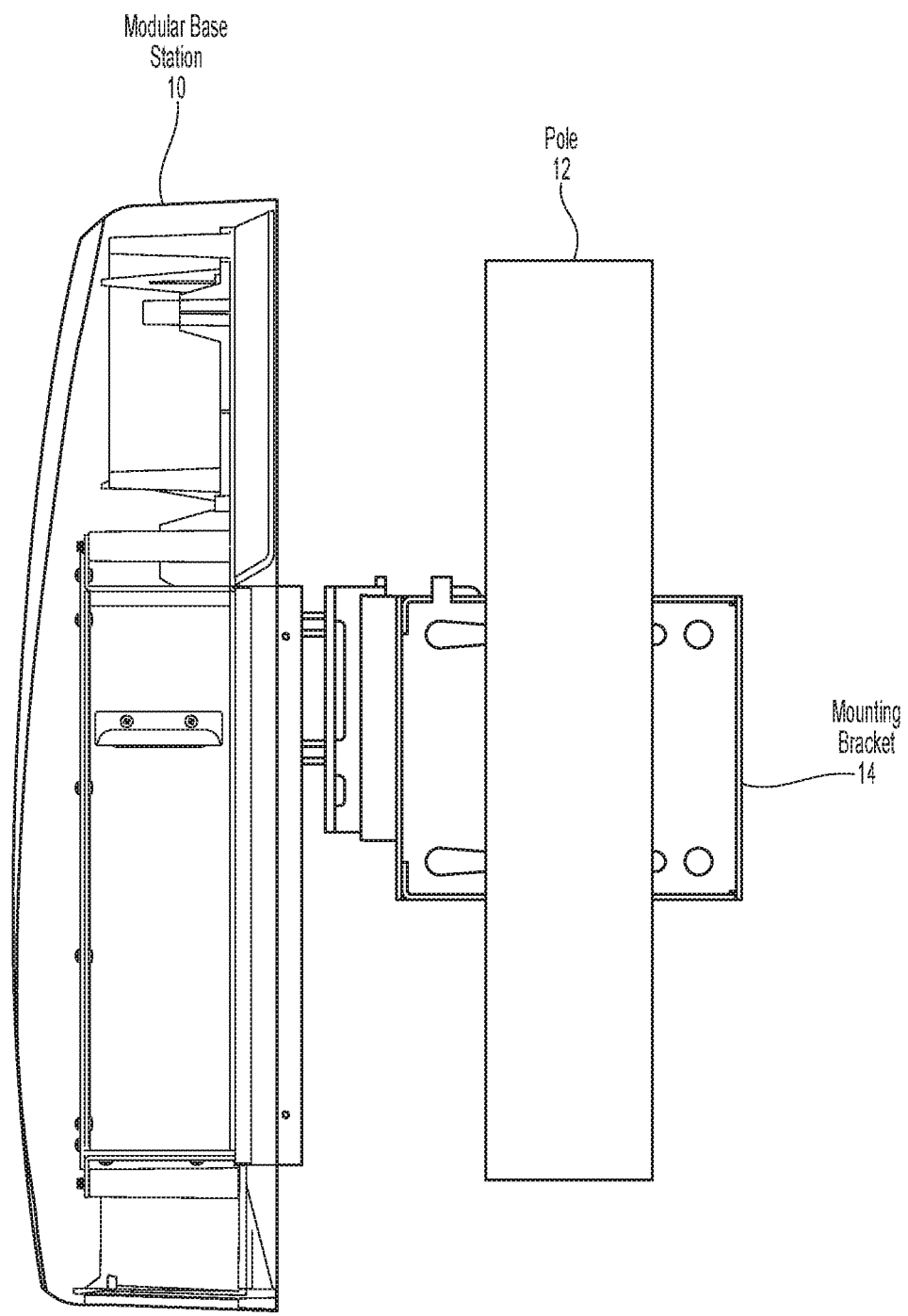
Figure 7C:
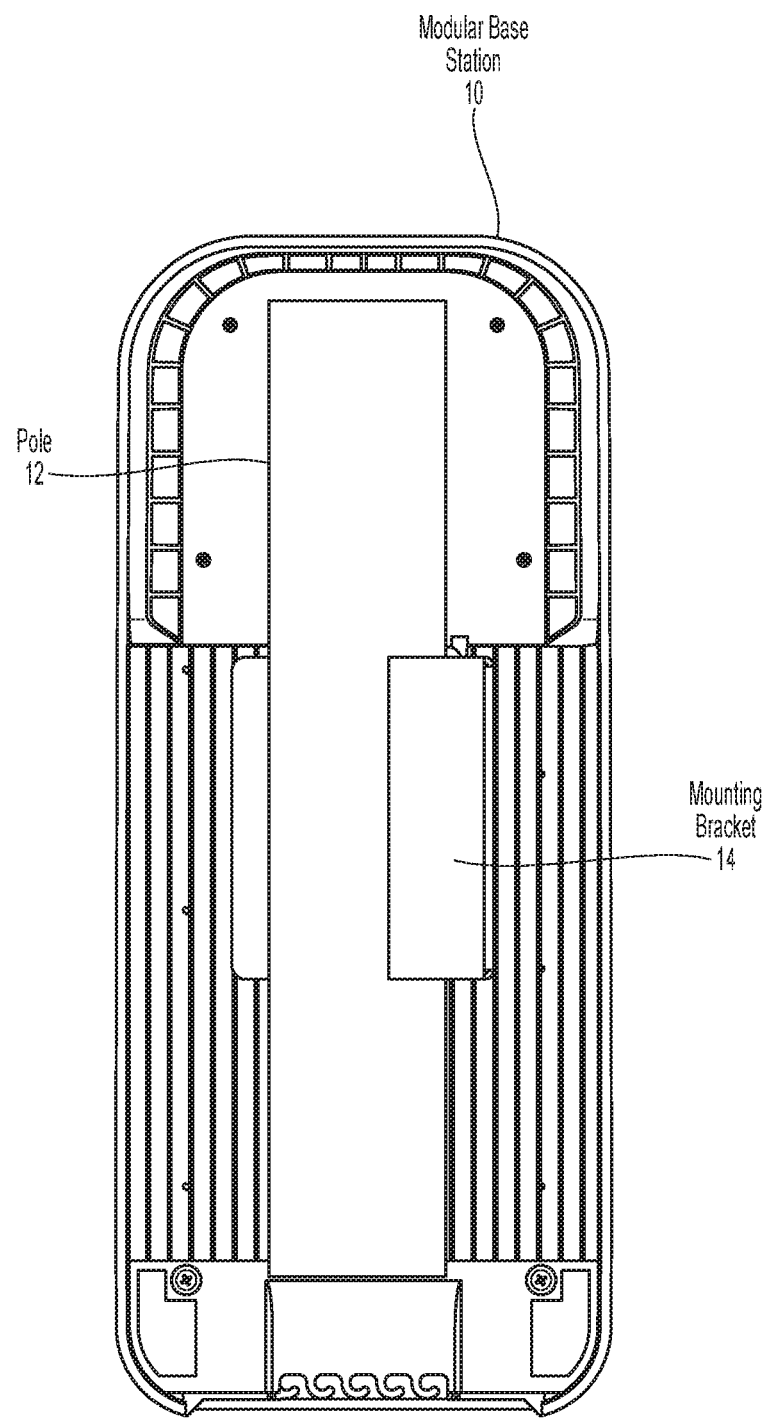

FIGS. 7A through 7C show semi-transparent views of examples of the MBS 10 mounted to the pole 12. In particular, FIG. 7A shows an isometric view of an example of a semi-transparent MBS 10 that is attached to a pole 12; FIG. 7B shows a side elevation view of an example of the semi-transparent MBS 10 attached to a pole 12; and FIG. 7C shows a bottom plan view of an example of a semi-transparent MBS 10 attached to a pole 12.

Figure 8:
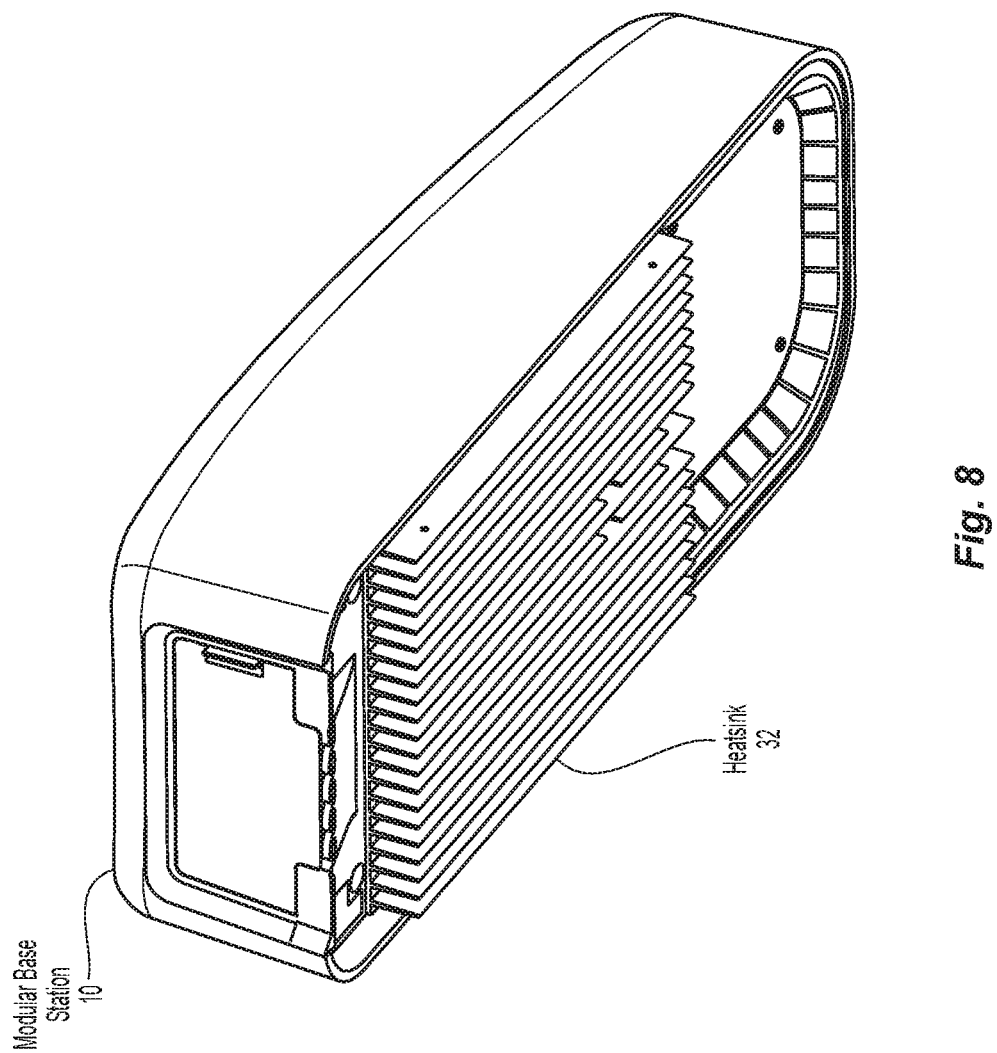
FIG. 8 shows an enlarged partial front-bottom view of the MBS that includes a heatsink according to some embodiments of the present disclosure.

The MBS 10 may optionally include a heatsink coupled to internal electrical components within the body of the MBS 10 to carry heat away from the MBS 10's interior areas. The heatsink may be a modular component that can be included in the MBS 10. For example, FIG. 8 shows an example of a bottom isometric view of the MBS 10 including a heatsink 32 projecting from the bottom surface of the MBS 10's body. The heatsink 32 allows for natural convection to help carry heat away from the MBS 10, thereby cooling the internal components of the MBS 10. The heatsink 32 of the illustrated embodiment includes several fins and a cutout for the mounting bracket 14, although other embodiments can utilize other heatsink configurations. In various embodiments, the heatsink 32 can be attached to the internal electrical components via a surface (e.g., bottom or side surface) of the MBS or other means.

Figure 9:
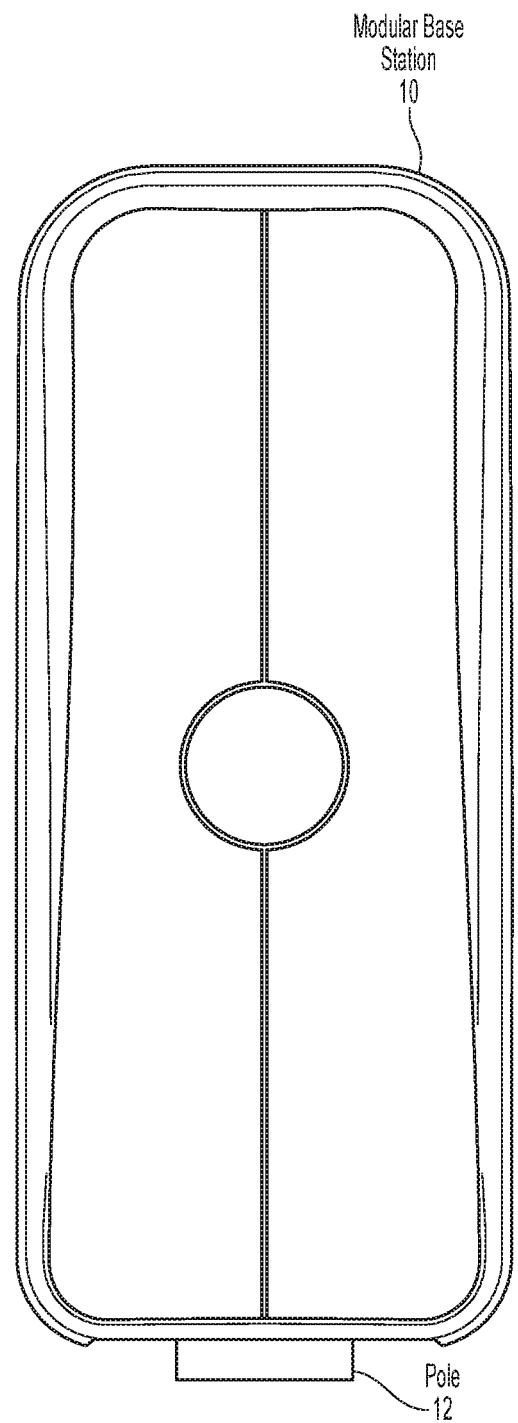
FIG. 9 shows a top plan view of the MBS of FIG. 8 according to some embodiments of the present disclosure.

The disclosed embodiments may include MBSs of different dimensions. For example, FIG. 9 shows an example of a top view of a tall (i.e., longer) MBS 10. As such, the MBS 10 of FIG. 1 may be "shorter" (e.g., 14 inches) compared to the taller MBS 10 (e.g., greater than 19 inches) of FIG. 9. The shorter MBS 10 of FIG. 1 might not include certain components included in the taller MBS 10 of FIG. 9; for example, the MBS 10 of FIG. 1 may not include any internal antennas, whereas the taller MBS 10 of FIG. 9 may include two internal antennas.

Embodiments of the disclosed MBS 10 include structural features that may allow for sustained and reliable operations in harsh environments and across a large range of temperatures and altitudes. Conventional base stations, in contrast, have limited operational capabilities and tend to break down relatively quickly.

Figure 10:
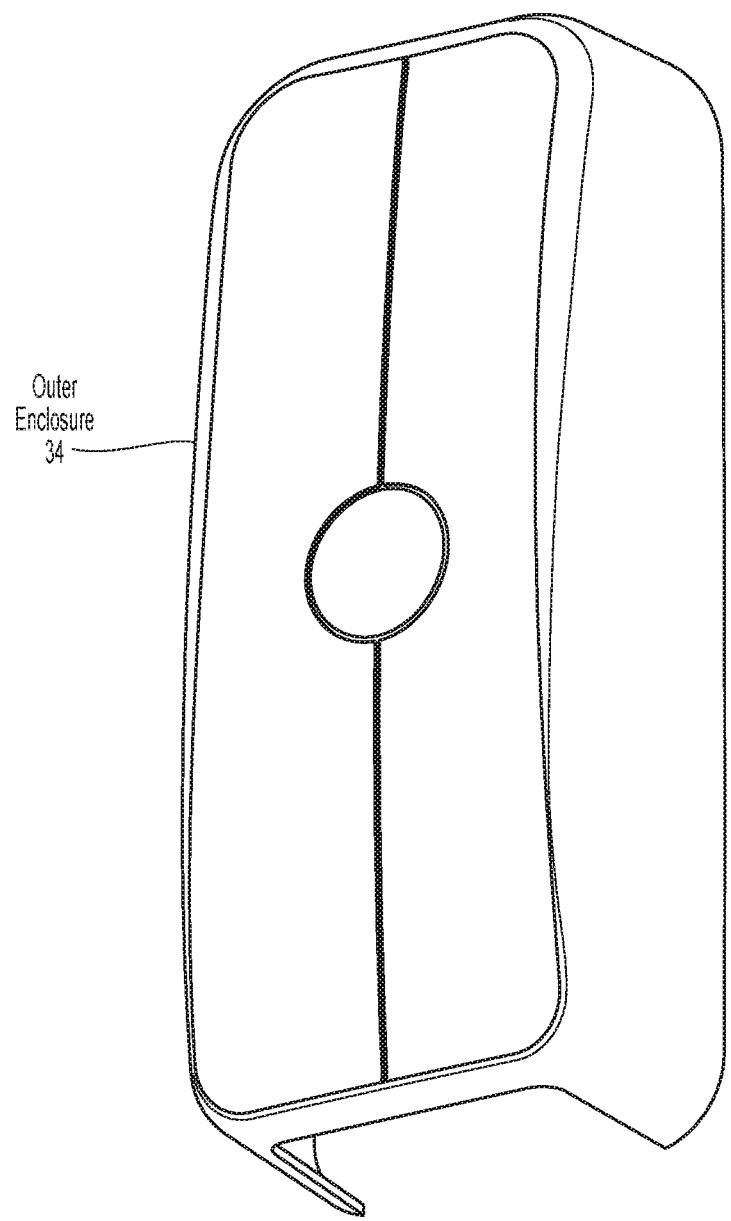
FIG. 10 shows an outer enclosure of the MBS according to some embodiments of the present disclosure.
Figure 11:
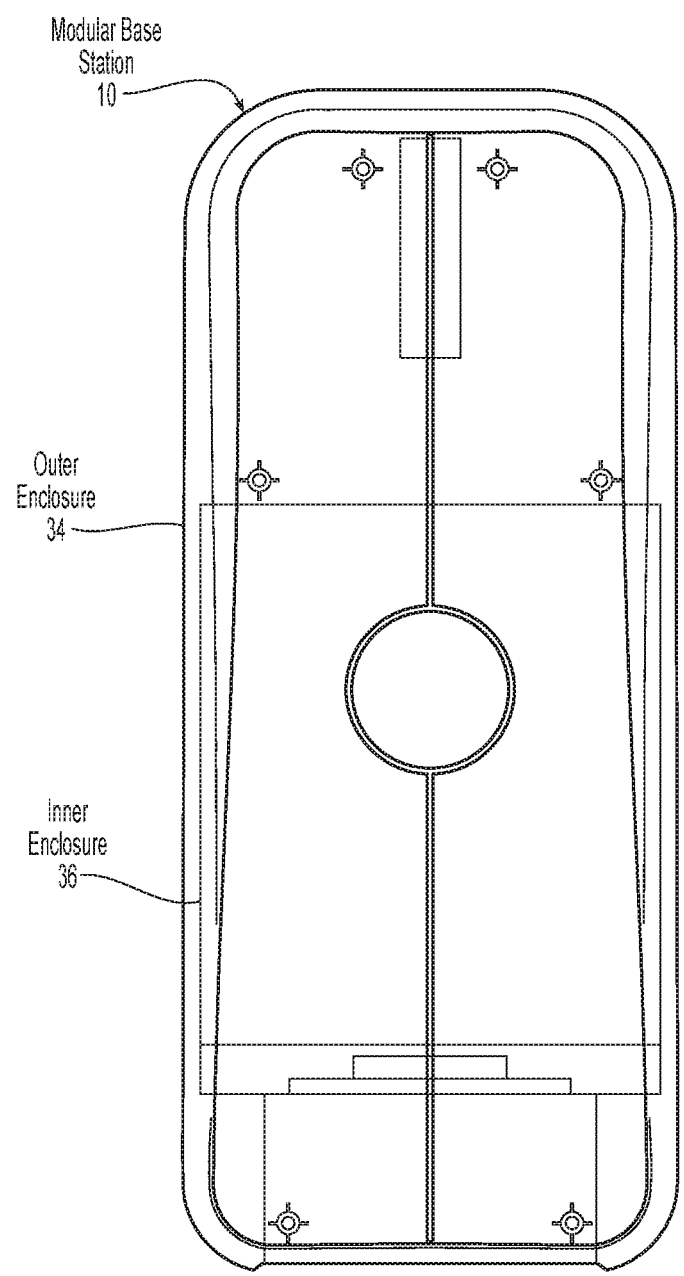
FIG. 11 shows a semi-transparent top plan view of the MBS according to some embodiments of the present disclosure.

The MBS 10 of the illustrated embodiment includes an outer enclosure (i.e., shell) that covers and protects a durable inner enclosure. For example, FIG. 10 shows an example of an outer enclosure 34 of the MBS 10. The outer enclosure 34 is a modular element that can be readily removed and/or replaced. FIG. 11 shows an example of a semi-transparent view of MBS 10 including the inner enclosure 36. The inner enclosure 36 may have any suitable length, including, for example, a length of about half of the length of the outer enclosure 34. The inner enclosure 36 is also a modular component that can be readily removed and/or replaced. The inner enclosure 36 houses electronics and other components that may, for example, be sensitive to environmental conditions. The inner enclosure 36 can also be connected to the heatsink 32 to carry heat away from the interior of the inner enclosure 36 and the associated internal components.

Figure 12:
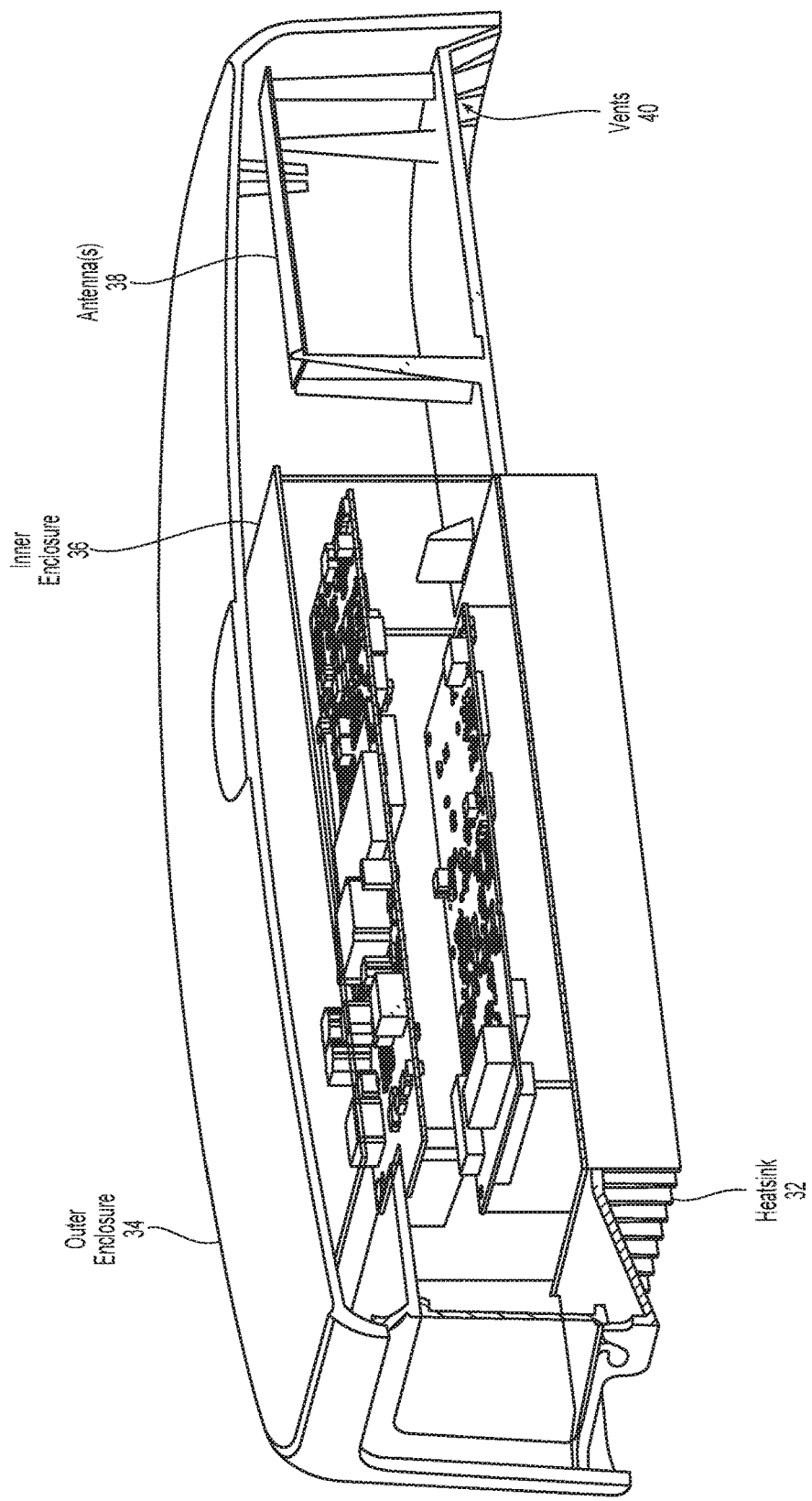
FIG. 12 shows a lateral cutaway of the MBS with a semi-transparent view of an inner enclosure according to some embodiments of the present disclosure.
Figure 13:
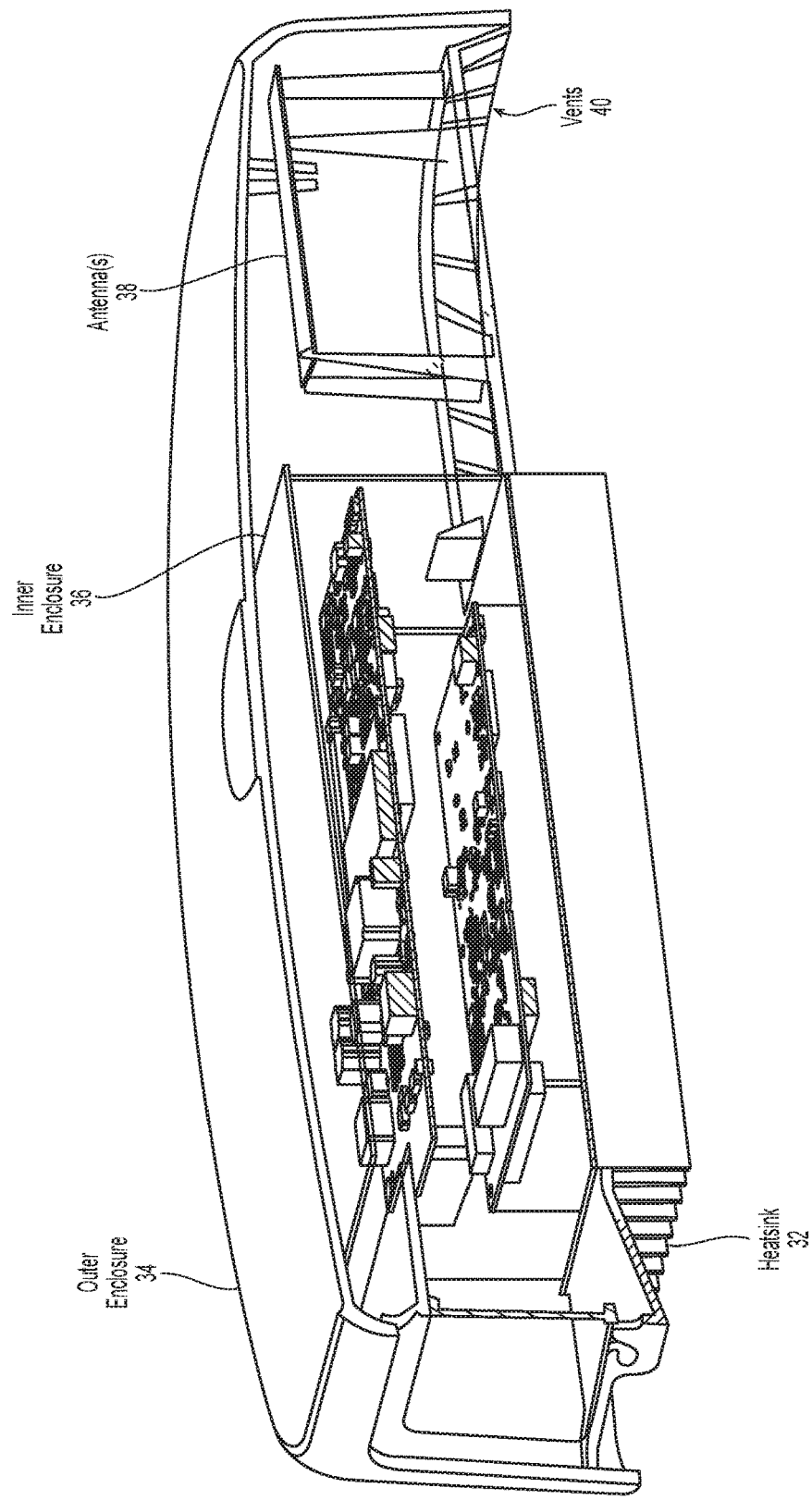
FIG. 13 shows a lateral cutaway of the MBS with a semi-transparent view of the outer and inner enclosures according to some embodiments of the present disclosure.
Figure 14:
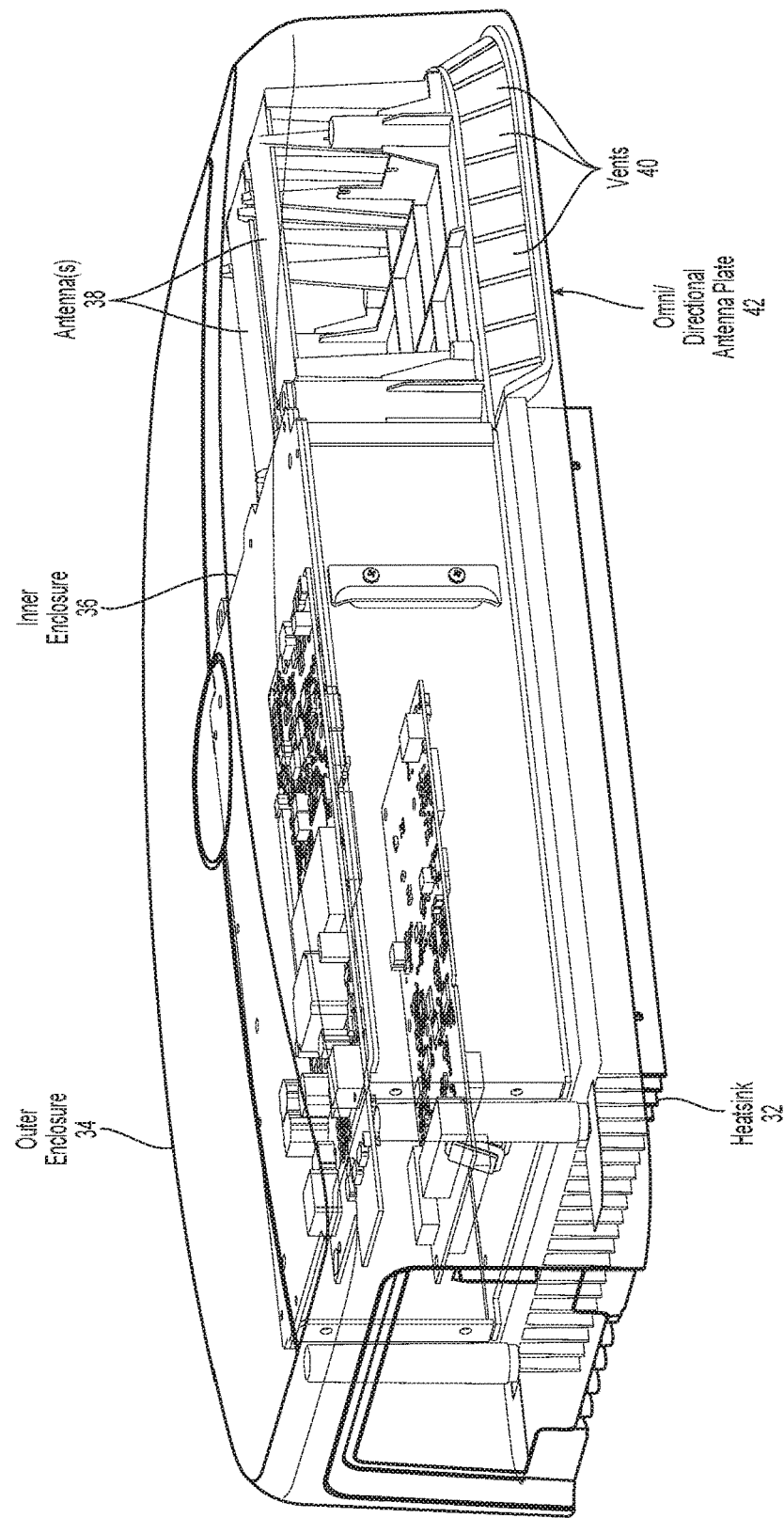
FIG. 14 shows a semi-transparent view of the MBS of FIG. 9 according to some embodiments of the present disclosure.

FIGS. 12 through 14 show examples of the structural features of the MBS 10 relative to internal components. In particular, FIG. 12 shows a lateral cutaway of an embodiment of the MBS 10 with a semi-transparent view of an inner enclosure 36. FIG. 13 shows a lateral cutaway of an embodiment of the MBS 10 with a semi-transparent view of the outer enclosure 34 and inner enclosure 36. FIG. 14 shows a semi-transparent view of an embodiment of the MBS 10.

The outer enclosure 34 may be formed of plastic or other durable material that will have minimal interference with one or more antennas 38 located internal to the outer enclosure 34, and outer enclosure 34 may operate as a buffer between the ambient environment and the inner enclosure 36 that houses, for example, a number of circuit boards and/or other components. The outer enclosure can include vents 40 adjacent to an antenna plate 42 for allowing airflow through the MBS 10 (i.e., instead of being sealed). This allows the MBS 10 to operate across a large range of temperatures and altitudes. For example, in particular embodiments, the MBS 10 can operate at temperatures between −40° C. and 55° C., and at elevations of up to approximately 20,000 feet or more because the design of the MBS 10 allows for greater airflow through the MBS 10 for cooling. In particular embodiments, the MBS 10 can tolerate the increase in internal ambient temperature caused by increasing altitudes. (e.g., at least 3° C. for every 1,000 feet). The outer enclosure 34 may also act as a solar shield.

As such, the MBS 10 can be deployed in regions such as Afghanistan, Northern India, the Himalayas, and other parts of Central Asia, which currently lack access to reliable base stations due in part to their altitudes. Moreover, the disclosed MBS 10 can be deployed at high altitudes without malfunctioning due to, for example, leakage or seeping of fluid (e.g., rain) into the MBS.

The outer enclosure 34 also protects the inner enclosure 36 from physical impacts. For example, the outer enclosure 34 may be designed to crack or break due to impact caused by falling on the ground; the outer enclosure 34 absorbs some of the impact loads, helping to ensure that the inner enclosure 36 can remain intact. As such, only the outer enclosure 34 would need to be replaced in such a fall, which can be done easily due to its modular design.

Figure 15B:
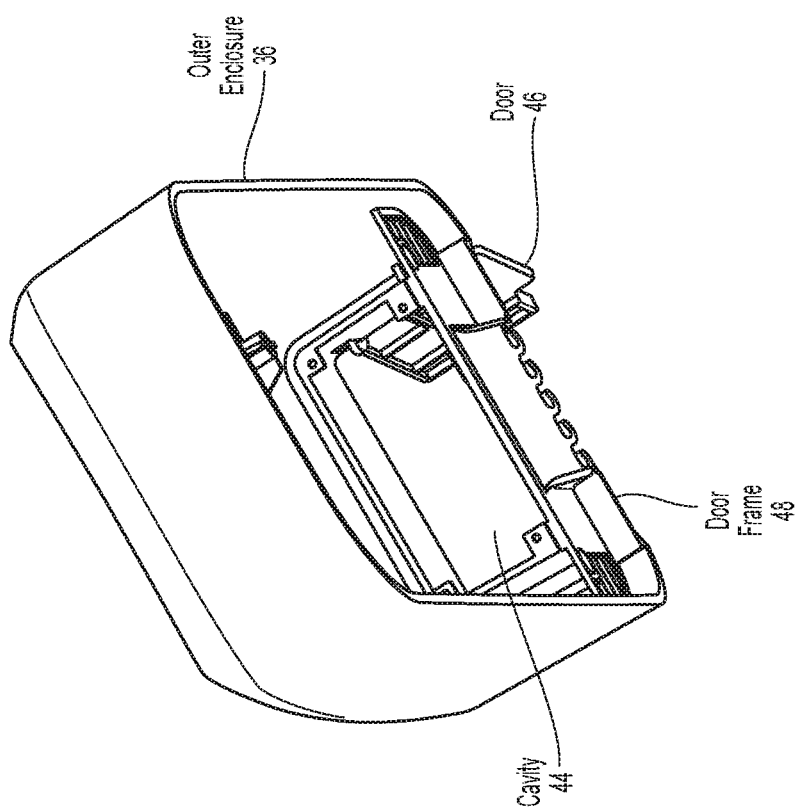

FIGS. 15A and 15B show examples of a front cavity 44 of the MBS 10. As shown, the cavity 44 is formed from three separate pieces: the outer enclosure 34, a door frame 48, and a door 46 that are assembled to form the front of the MBS 10. As discussed further below, the cavity 44 houses an interface with connectors coupled to the electronic components included in the inner enclosure 36.

Figure 16:
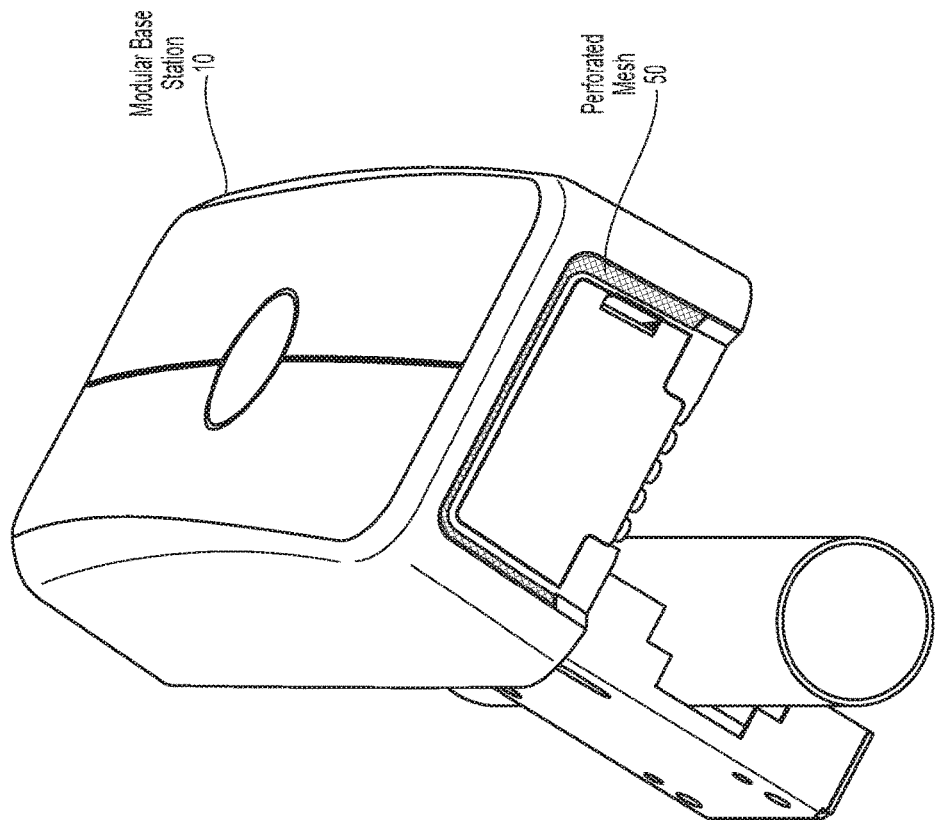
FIG. 16 shows an isometric view of an embodiment of the MBS including a door frame with perforated mesh around the door.

The MBS 10 may be both durable and breathable (e.g., permeable to air and liquids). For example, FIG. 16 shows a view of the MBS 10 of an embodiment including a perforated mesh 50 around the perimeter of the door frame 48. As such, the outer enclosure 34 is permeable to fluid (e.g., airflow) through the perforated mesh 50 while the inner enclosure 36 may be completely sealed from outer elements. For example, moisture that seeps into the MBS 10 through the outer enclosure 34 can exit through the perforated mesh 50 at the front of the MBS 10 without affecting the electronics contained in the inner enclosure 36.

Referring back to FIGS. 12 through 14, these embodiments of the MBS 10 include one or more antennas 38. As shown, antenna 38 is housed in the portion of MBS 10 that is external to the inner enclosure 36 but enclosed by the outer enclosure 34. Each antenna 38 may be a flat surface suspended by four pyramidal-type pillars. This configuration of pillars helps to minimize contact with each antenna 38 and provides a distance between the removable antenna plate 42 located on the bottom of the MBS 10. In some embodiments, the MBS 10 may include any number of antennas that may, for example, have a side-by-side configuration (i.e., are co-planar). The antennas could be jointly steered (or passive) to operate in conjunction with the removable plate 42.

Referring specifically to FIG. 14, the antenna plate 42 reflects signals to allow the one or more antennas 38 to operate as an omni or directional antenna depending on whether the antenna plate 42 is inserted in the MBS 10. The antenna plate 42 is connected to the outer enclosure 34 to form a bottom portion of the MBS 10 adjacent to the heatsink 32. As indicated above, the outer enclosure 34 can include vents 40 adjacent to the antenna plate 42. The antenna plate 42 can be secured to the MBS 10 with screws or other fasteners, so the antenna 38 is protected within the interior area defined by the outer enclosure 34 and the antenna plate 42. The antenna 38 is configured as a directional antenna while the plate 42 is inserted into the back of the MBS 10, and the antenna 38 is configured as an omni antenna while the plate 42 is removed from the back of the MBS 10. As such, the multiple antennas could be jointly steered (or passive) to operate in conjunction with the removable plate 42 as omni or directional antennas.

The ability to configure the one or more antennas 38 as omni or directional antennas is another modular aspect of the MBS 10, which allows for tuning performance depending on a region where the MBS 10 is deployed and what configuration of a signal would be desirable. For example, the antenna 38 could be configured as an omni antenna if the MBS 10 is deployed in the middle of a valley and the client equipment was in all directions around the MBS 10.

The pillars may sit atop a dome structure formed, in part, by the vents 40, and each antenna 38 may be suspended by the pillars that sit atop the dome structure. As such, air can flow in through the perforated mesh 50, over the inner enclosure 36, and out of the vents 40 (and vice-versa) to provide cooling (augments cooling by the heatsink 32).

Figure 17:
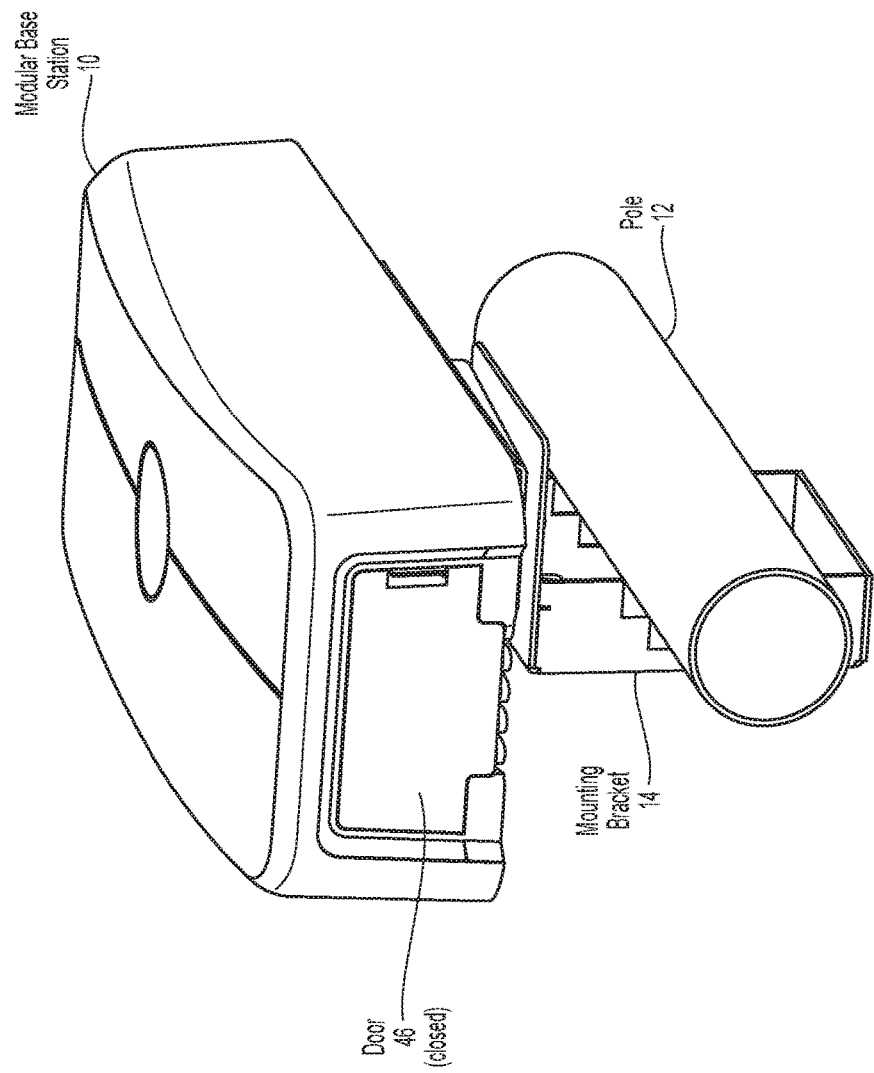
FIG. 17 shows an isometric view of the MBS with the door in a closed position according to some embodiments of the present disclosure.
Figure 18:
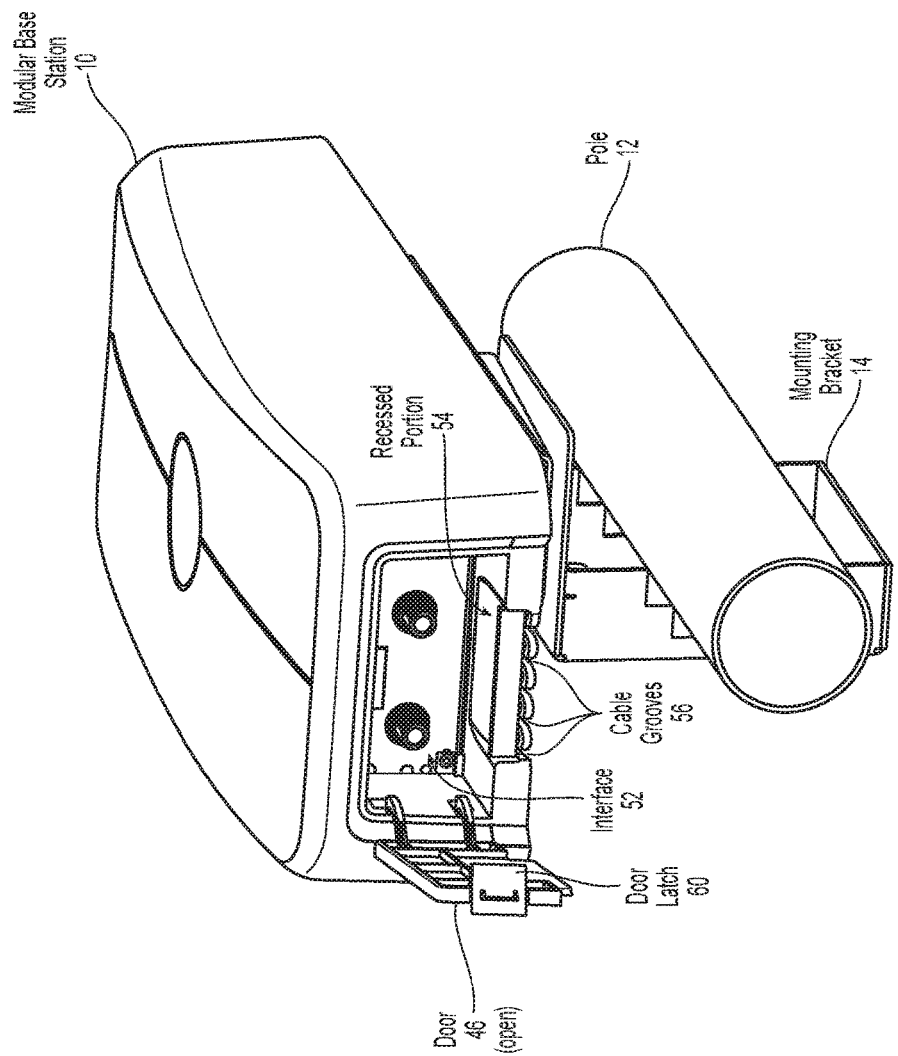
FIG. 18 shows the MBS of FIG. 17 with the door in an open position according to some embodiments of the present disclosure.

As indicated above, the MBS 10 includes a cavity 44 that houses connectors for interfacing with the MBS 10. The door 46 enclosing the cavity 44 can be opened to access the connectors and closed to secure the connectors from the environment. For example, FIG. 17 shows an example of the door 46 of the MBS 10 in a closed position fully closing the opening in the door frame 48. FIG. 18 shows an example of the door 46 in an open position, thereby providing access into the cavity 44 through the opening in the door frame 48 of the MBS 10. As such, the door 46 can be opened to connect components housed in the inner enclosure 36 to components external to the outer structure 34.

Figure 19:
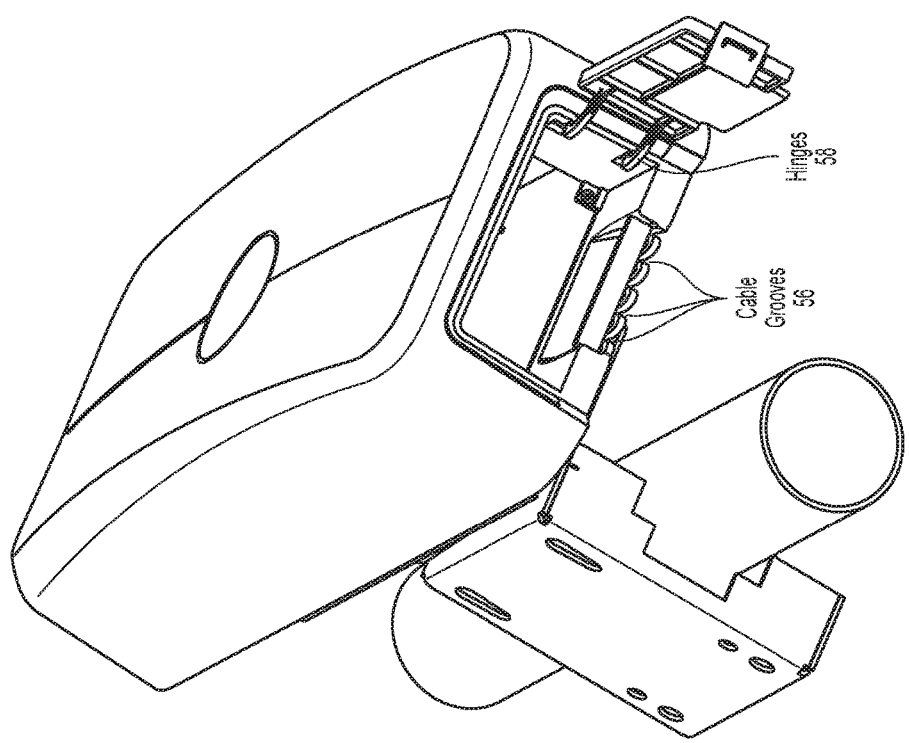
FIG. 19 shows an embodiment of the MBS with cable grooves formed in the lower portion of the door frame according to some embodiments of the present disclosure.
Figure 20A:
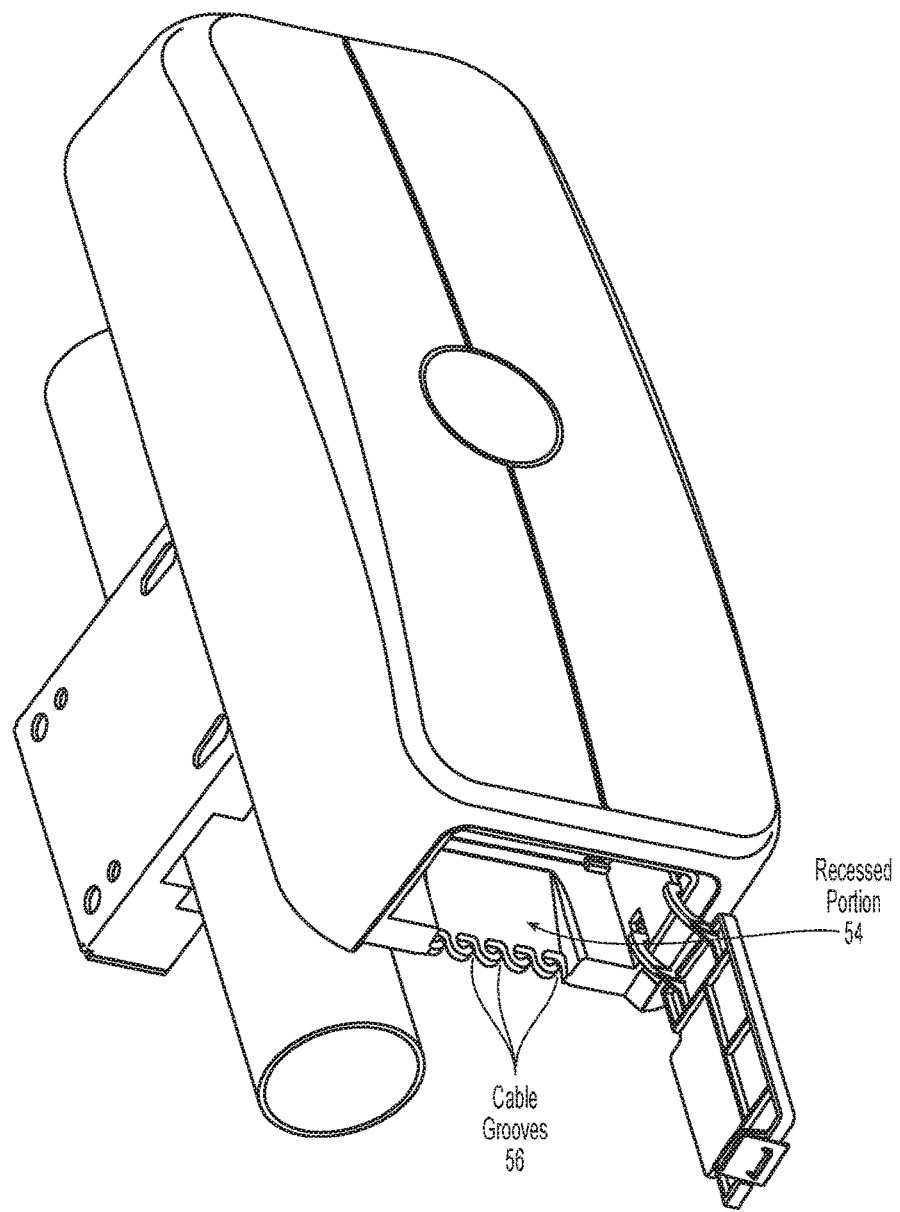
FIGS. 20A and 20B are enlarged isometric views of a front portion of the MBS of FIG. 19 with the cable grooves in the door frame according to some embodiments of the present disclosure.
Figure 20B:
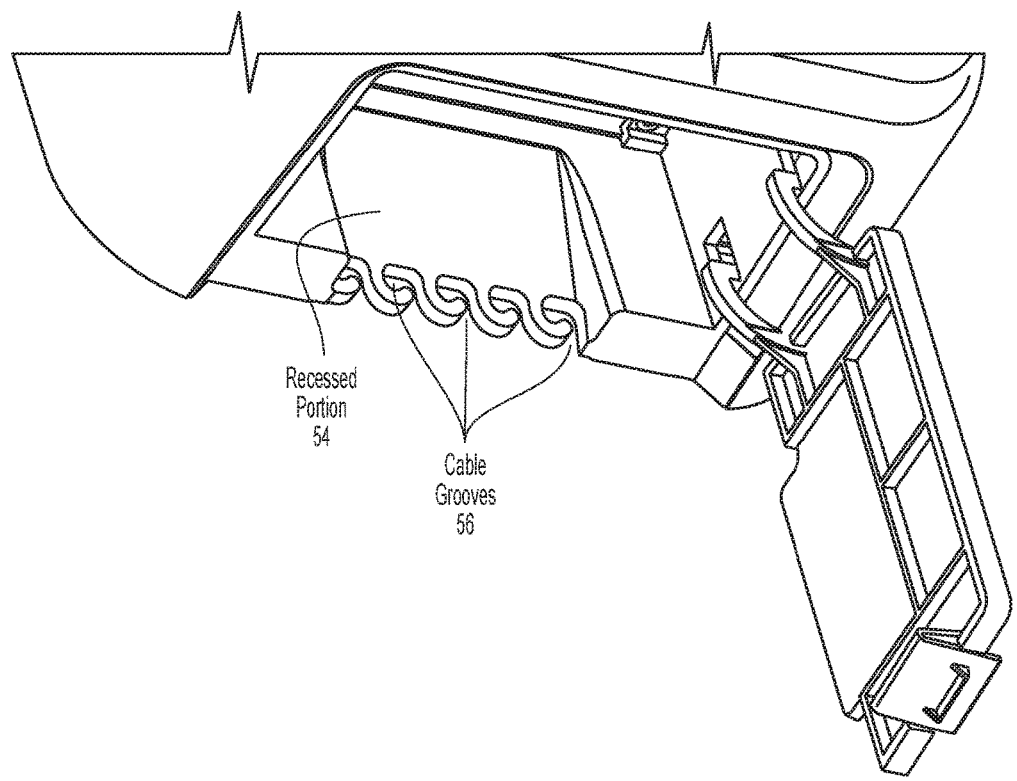

As shown, the door 46 on the front of the MBS 10 acts as a barrier between an ambient environment and the cavity 44 that includes connectors (e.g., IP-rated connectors) of an interface 52 for connecting to external devices. The cavity 44 has a recessed portion 54 that leads to cable grooves 56 for cables that extend from the cavity 44 to external devices. For example, FIG. 19 shows an example of the cable grooves 56 and door hinges 58 of the open-door structure of FIG. 18. FIGS. 20A and 20B show examples of progressively larger views of cable grooves 56 of the MBS 10, respectively.

Specifically, in the example embodiment illustrated in FIGS. 20A and 20B, the MBS 10 includes five cable grooves 56 formed on the door frame 48. The grooves 56 may be of different sizes for accepting cords (e.g., cables) of different sizes. As shown, the cable grooves 56 accept N-Type 1, RJ45s (RJ-1, RJ-2), N-Type 2, and power cables. As such, for example, an N-Type cable can run from the N-Type connector on the interface 52 through the N-Type-sized groove to the external environment.

The use of cable grooves 56 may reduce strain on the cables. For example, conventional devices include connectors on an outer shell. This can cause strain on the cables coupled to the connectors (e.g., due to forces (e.g., gravity) pulling on the cables). In contrast, the cable grooves 56 of the MBS 10 may relieve such strain on the cables. This configuration may also reduce costs because special-purpose environmentally insensitive components (e.g., RJ45 connectors) are not necessarily required for functioning.

As shown, the door frame 48 includes hinges 58 that attach the door 46 to the door frame 48. The hinges 58 allow the door to pivot open and closed. The hinges 58 also avoid straining a user attempting to install devices to the interface 52 of the MBS 10 by acting to keep the door 46 attached to the MBS 10 while the user is connecting devices to the interface 52. The door 46 also includes a latch 60 on the side opposite to the hinges 58 to secure the door 46 when closed.

Figure 21:
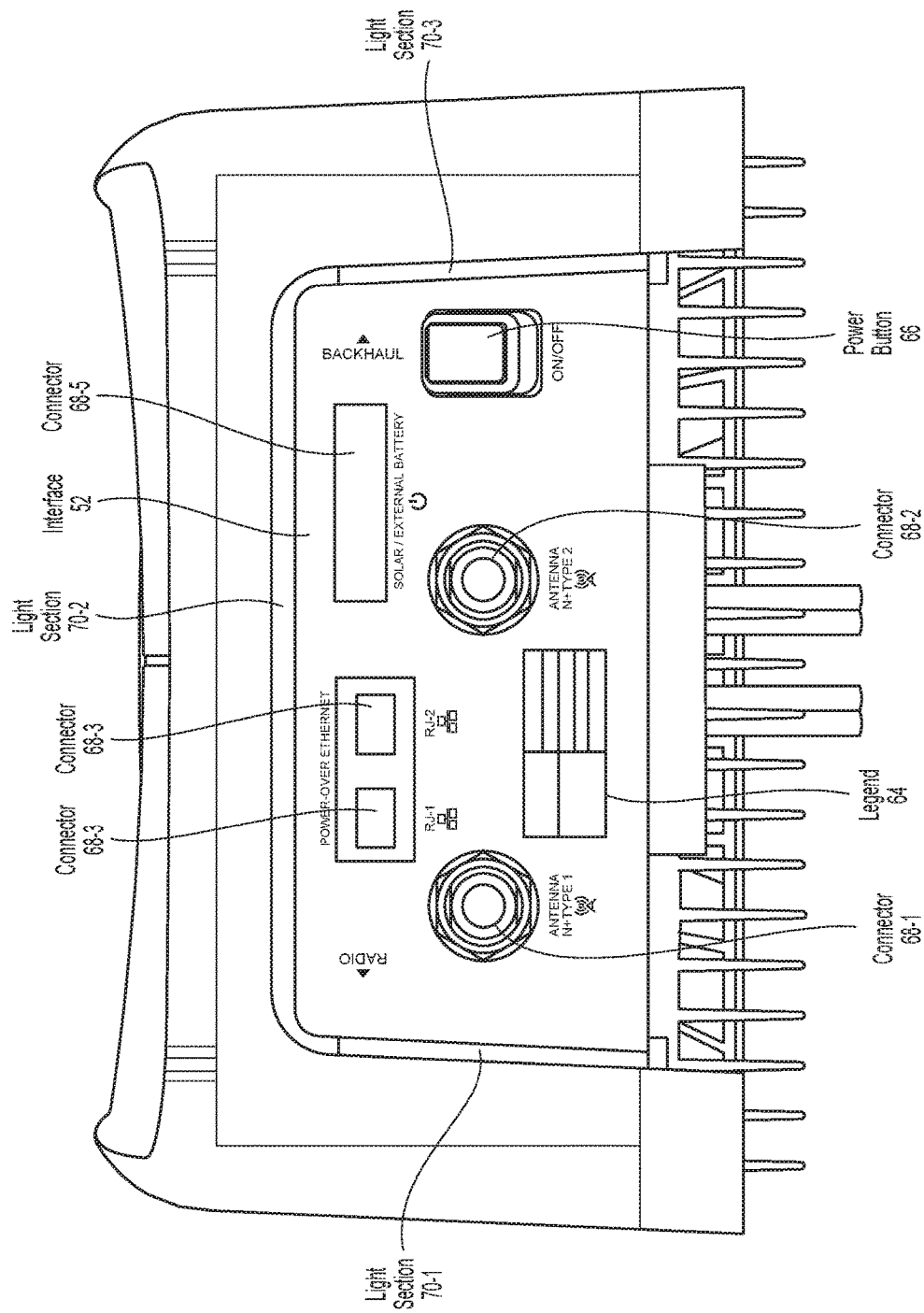
FIG. 21 shows an interface and light status system of the MBS according to some embodiments of the present disclosure.
Figure 22:
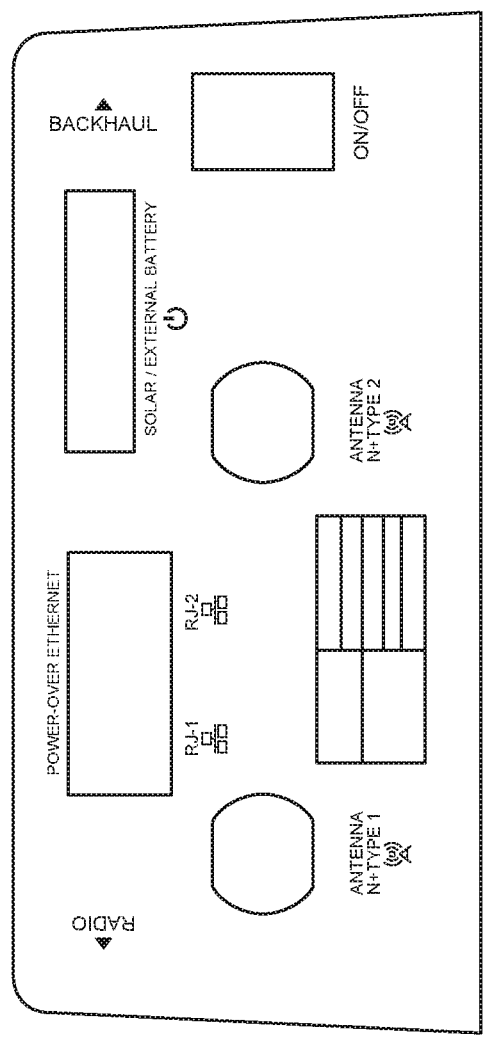
FIG. 22 shows labels for the interface of the MBS according to some embodiments of the present disclosure.

FIGS. 21 and 22 show an example embodiment with a number of connectors 68 on the interface 52 for connecting the electronics of the MBS 10 to external devices. In particular, FIG. 21 shows an example of the interface 52 and light status system of the MBS 10, and FIG. 22 shows example labels for the interface 52 of the MBS 10.

As shown, the interface 52 includes components such as a legend 64 for the light status system, a power button 66, and connectors 68 (e.g., N-Type 1, N-Type 2, RJ-1, RJ-2, and a group of power connectors). The two N-Type connectors (68-1 and 68-2) allow for connecting external antennas to the MBS 10. The external antennas could replace or augment the functions of one or more internal antennas 38. For example, software included in the MBS 10 could control switching operations between the internal antennas 38 and any external antennas.

The illustrated example interface 52 also includes RJ45 connectors (RJ-1 (68-3) and RJ-2 (68-4)). The RJ-1 connector 68-3 could be utilized to supply power to the MBS 10 (e.g., Power-over-Ethernet (PoE)), and the RJ-2 connector 68-4 could be utilized to supply power from the MBS 10 to an external device (e.g., another MBS 10). For example, the RJ-2 connector 68-4 could be utilized to charge a mobile device or any other suitable device. Further, an injector could be utilized to compensate for losses due to devices located, for example, greater than 100 meters from the MBS 10.

The interface 52 also includes a 5-pin connector 68-5 to provide connections for external power sources. Examples of external power sources include solar and external batteries. Specifically, two of the five pins could be for external power sources. The power could a be a 24 Volt DC source obtained from a solar panel. Two of the remaining three pins could be for an external battery, and the last pin could be for monitoring the external battery (e.g., lithium battery) for power management purposes. For example, the MBS 10 could monitor the temperature of the external battery and respond accordingly with corrective actions. In some embodiments, the MBS 10 could monitor the charge status of the external battery and extract power from the solar panel to charge the external battery when desirable.

As such, the MBS 10 may have multiple, redundant power sources to maintain an uninterrupted power supply (UPS). For example, the MBS 10 may include a power management system to monitor and control both the power sources and the external devices that utilize the power sources to extract power. For example, the power management system could set a preference for DC power over PoE but rely on PoE if the DC power is unavailable (e.g., external battery and solar power are unavailable). Details about the power management system and its operations for providing a UPS by switching between appropriate power sources are described further below.

The connectors 68 of the interface 52 may be positioned to facilitate ease of connecting cables to the interface 52 by hand. For example, N-Type connectors (68-1 and 68-2) are located in the middle area of the interface, and RJ-1 connector 68-3 and RJ-2 connector 68-4 are located closer to the boundary of the interface 52 (e.g., above the N-Type connectors 68-1 and 68-2). This configuration allows for a person's hand to fit into the cavity 44 to screw in the N-Type connectors 68-1 and 68-2, and plug in the RJ-1 and RJ-2 connectors 68-3 and 68-4.

The recessed portion 54 of the cavity 44 also facilitates a hand to fit into the cavity 44 even when rigid cables are connected to the interface 52 because the cables are routed along the recessed portion 54. For example, a person can screw in a first N-Type connector 68-1, route it through the recessed portion 54, and secure it to a first cable groove 56-1. The person can then connect a second N-Type connector 68-2 in a similar manner with minimal obstruction by the cable of the first N-Type connector 68-1.

Referring back to FIG. 21, the MBS 10 includes a light status system utilized to signal a status or event of the MBS 10 to persons local to the MBS 10. As shown, the light status system includes a configuration of multiple light sections 70 that may form any suitable shape, including the illustrated "U" shape on the front of the MBS 10. Specifically, the three light sections 70-1, 70-2, and 70-3 are located on the perimeter of the door frame 48.

The light status system is a mechanism for signaling the status of the MBS 10 to persons that are located within line-of-sight (e.g., within a distance such as five kilometers) from the MBS 10 (e.g., a person on the ground away from a pole-mounted MBS 10). A combination of the variable light shape, colors, and patterns (e.g., circulating, pulsing, or flashing) of the light status system can effectively communicate a variety of readily understandable information to persons on the ground.

In the example embodiment shown, the light status system uses red and green colors to illuminate the three light sections 70 in accordance with different patterns used to signal the status of the MBS 10. The left light section 70-1 communicates the status of the radio, and the right light section 70-3 communicates the status of the backhaul. Specifically, a green circulating pattern signals a "booting up" status; a green pulsing pattern signals a "running normal" status; a red pulsing pattern signals an "error encountered" pattern; a red, left flash pattern signals a "radio failure" status; and a red, right flash pattern signals a "backhaul failure."

Figure 23:
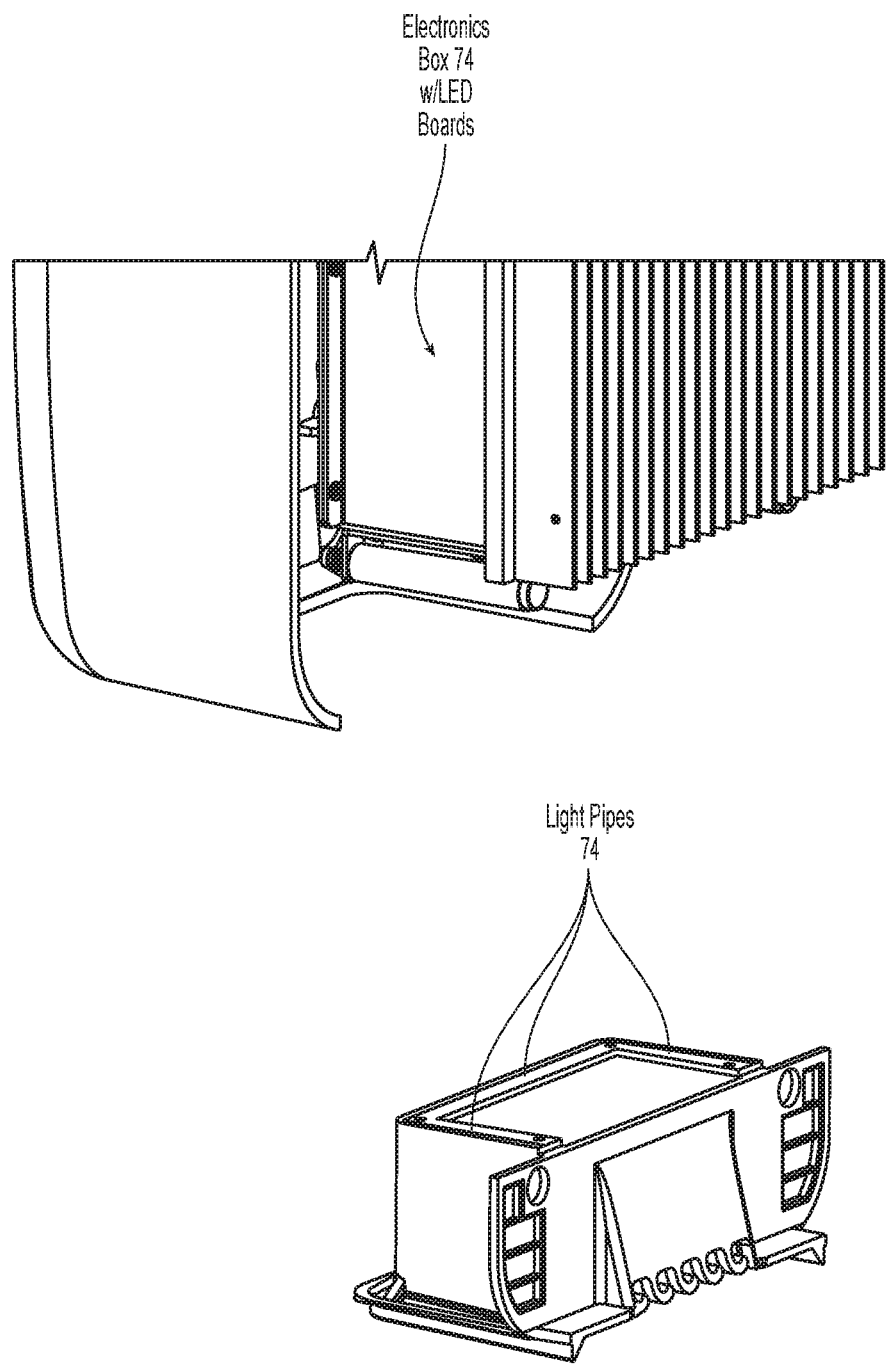
FIG. 23 is an exploded view of a portion of the MBS according to some embodiments of the present disclosure.

FIG. 23 is an exploded view of an example of a portion of the MBS 10 that includes the light status system. As shown, various structural components form a portion of the MBS 10 including the light status system (e.g., light pipes 72) and the interface 52 when assembled. Specifically, portions of the light status system are structurally embedded in walls that form the front of the MBS 10. In particular, light pipes 72 are embedded in the three walls of the cavity 44. The light pipes 72 channel light from LED boards of an electronics box 74 to the exterior perimeter of the door frame.

As such, a person on the ground may see LEDs blinking inside the MBS 10 because the light is channeled into the light pipes 72 in such a way that facilitates their visibility by that person. For example, a user of a mobile device that is connected to the MBS 10 and that experiences an event (e.g., connection failure) could simply look up to the MBS 10 attached to a pole to determine the reason for the event based on the information signaled by the light status system.

FIG. 23 shows various other components that have been discussed above or are discussed further below such as the door 46, hinges 58, a housing for the cable grooves 56, vents (i.e., breathable mesh 50), and a heatsink 32. As indicated above, many of these components may be modular elements of the MBS 10.

The MBS 10 may be a turnkey device that includes hardware, firmware, and/or software components that are operable to function in such a way that a person with little or no specialized or technical training could install and use the MBS 10. As discussed below, the MBS 10 includes modular components that can be configured independently and assembled to form a network-in-a-box (NIAB).

As indicated above, the MBS can be representative of a system that includes two subsystems: general-baseband computing (GBC) and RF subsystems. The GBC can further comprise power, housekeeping micro-controller, timing/sync module, sensors, and control mechanisms. The MBS can be operational as a platform that is designed to take various input power sources: PoE (power-over-ethernet), PVC/solar, DC, and external batteries (e.g., sealed lead acid battery) and an internal battery (e.g., lithium battery). Numerous sensors (e.g., temperature, voltage and current) can be used to ensure that the system is functional within its operating limits.

The following is a non-limiting list of components that could be included as part of the hardware design of the MBS:
OBCC
BMS
Sensor
Controller
Sync
Processor
Front-end
RFIC
FPGA|SoC
PoE|QC|UPS|Solar|DC
USB3|Eth|PCIe controller On the RF sub-system, the MBS can have multiple options based on a software-defined radio (SDR) or a system-on-chip (SoC). In some embodiments, the SDR version can support GSM/LTE and run open-source software stacks (e.g., openBTS and osmocom for 2G). In some embodiments, the SoC version includes a separate card, and supports commercial LTE software stacks. In some embodiments, the MBS can support two configurations: a full network-in-a-box, when the daughter card is combined with the GBC board, and alternatively as an access point, when the daughter card is operating standalone (in some embodiments, only the SoC version supports this configuration).

Disclosed embodiments of the MBS 10 can include at least one internal quad-band antenna (e.g., antenna 38). As such, the internal antenna 38 may operate on all GSM frequency bands. The MBS 10 may be connected to external antennas as well or in place of one or more internal antennas 38. Electronics and software stored in memory may control the internal and/or external antennas to operate together or independently. Moreover, as indicated above, the antenna (e.g., antenna 38) operates as either an omni antenna or a directional antenna depending on whether the removable plate 42 is attached to the bottom of the MBS.

Figure 24:
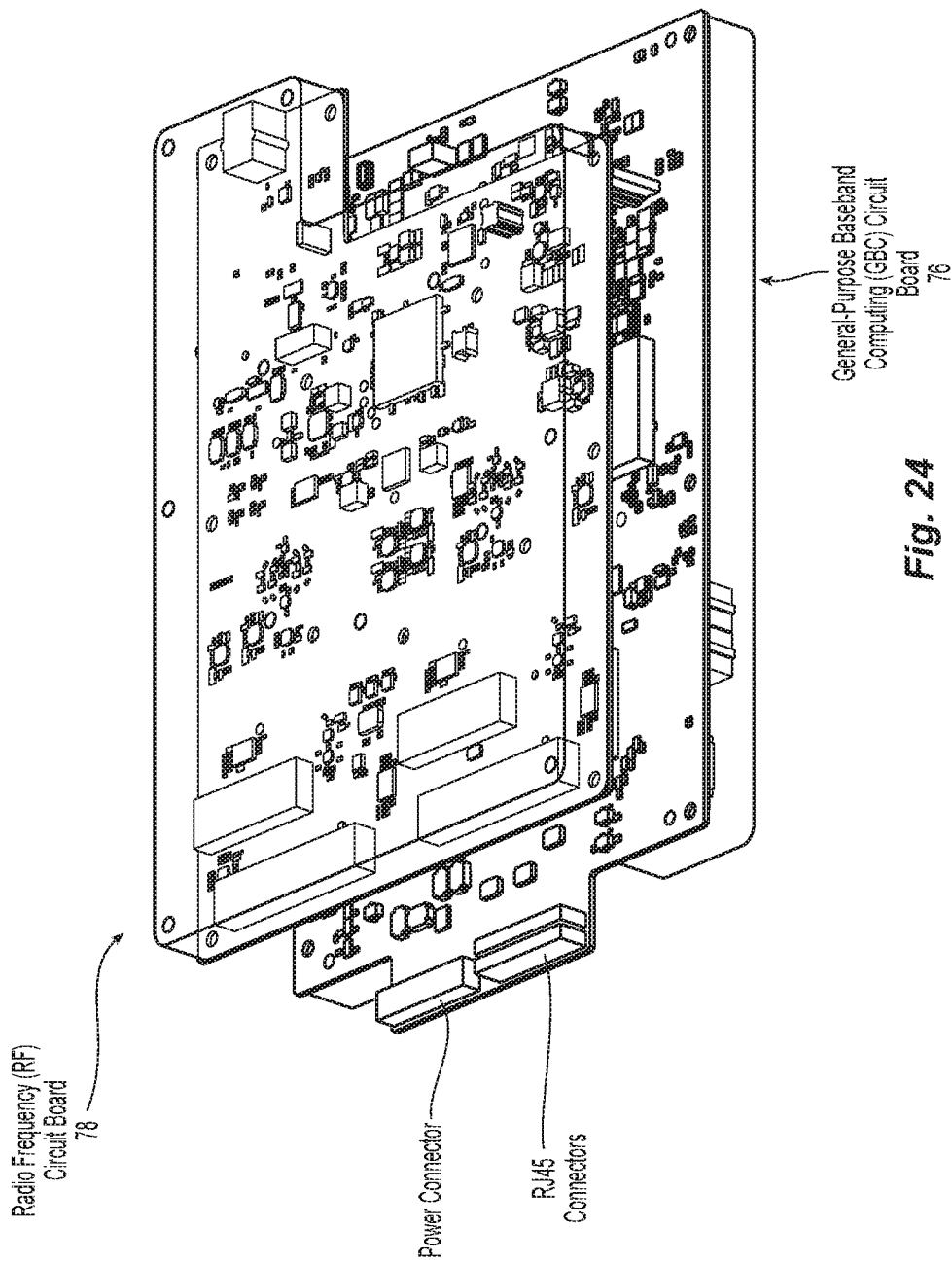
FIG. 24 shows a perspective view of electronics included in the MBS according to some embodiments of the present disclosure.
Figure 25:
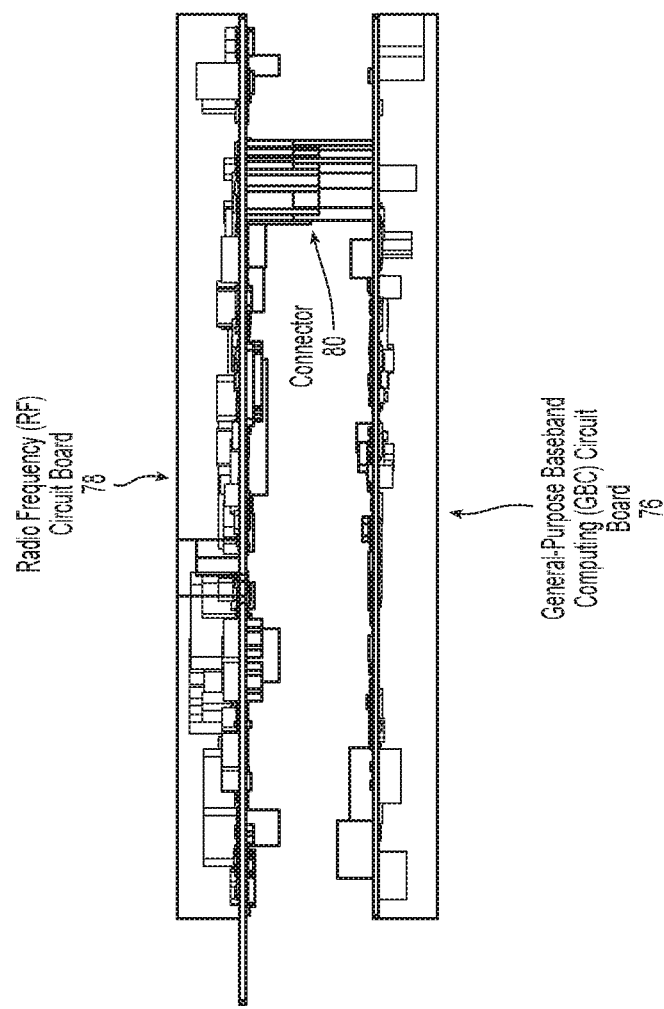
FIG. 25 shows a lateral view of the electronics included in the MBS according to some embodiments of the present disclosure.

The architecture of the MBS 10 includes one or more modular circuit boards. For example, FIG. 24 shows a perspective view of one possible configuration of electronics included in an example MBS 10. FIG. 25 shows an embodiment of a lateral view of the electronics included in the example MBS 10. As shown, the example MBS 10 includes two circuit boards: a general-purpose baseband computing (GBC) circuit board 76 and a radio frequency (RF) circuit board 78. These boards are module components of the MBS 10 and, as such, may be referred to as a GBC module and RF module, respectively.

The MBS 10 may be deployed in a variety of configurations. In some embodiments, the MBS 10 may be provided without an RF module 78 and/or GBC module 76. As such, for example, a local operator could supply and port an internal or external RF module (e.g., GSM or LTE module) to the GBC module 76. In some embodiments, multiple MBSs can be deployed without RF modules to conserve resources of the GBC modules and, instead, the MBSs could be connected to external devices that provide RF functionality via, for example, Ethernet, long-distance Wi-Fi, or similar technologies. Lastly, in some embodiments, different radio technologies could be utilized simultaneously by connecting a number of RF modules in a daisy chain configuration to provide the different radio technologies to users in the same area.

In the illustrated example embodiment of FIG. 25, the two circuit boards 76 and 78 are connected by a single connector 80. The two circuit boards 76 and 78 are assembled via "blind mating." In particular, the GBC board 76 is first attached to the heatsink 32 and the RF board 78 is then connected to the GBC board 76 via the single connector 80 as the inner enclosure 36 is closed. As such, use of the single connector 80 facilitates the blind mating. Moreover, the spacing between the circuit boards 76 and 78 allows for other connectors 68 (e.g., the N-Type connectors 68-1 and 68-2) to connect to the circuit boards 76 and 78. In addition, shielding (not shown) may be disposed between the circuit boards 76 and 78.

Figure 26:
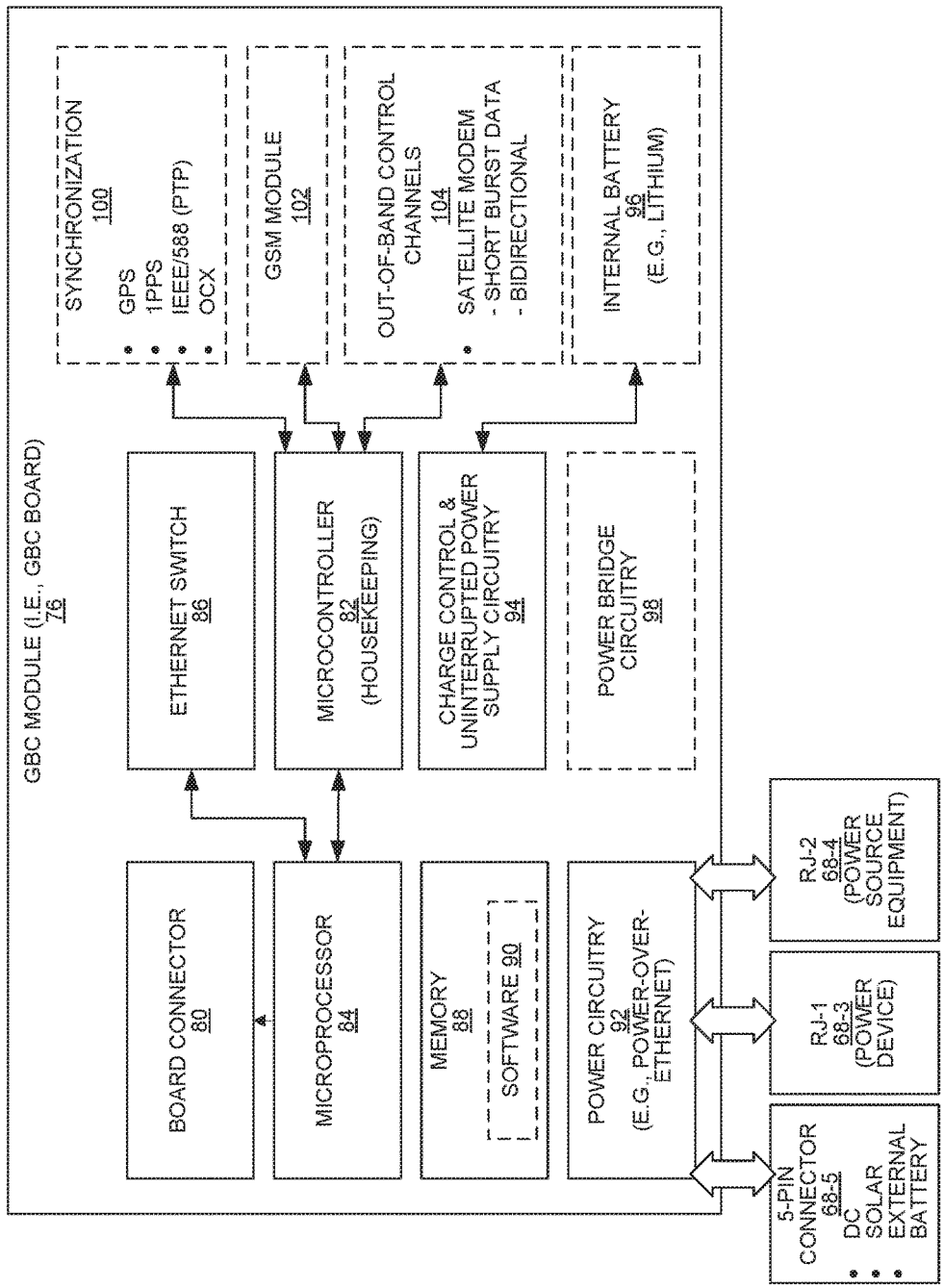
FIG. 26 is a block diagram of a general-purpose baseband computing (GBC) circuit board of the MBS according to some embodiments of the present disclosure.

FIG. 26 is a block diagram of an example GBC board or module 76. As shown, the GBC module 76 includes a microcontroller 82, microprocessor 84, board connector 80, Ethernet switch 86, communication components, and power-related components coupled to power connectors.

The microcontroller 82 performs housekeeping functions. Housekeeping functions include activating, controlling, managing, and monitoring the GBC and RF portions (if any) of the MBS 10. For example, the microcontroller 82 activates the microprocessor 84 and the RF module 78, controls switching, and sets frequencies. As such, the microcontroller 82 is powered on as soon as the MBS 10 is powered on.

The microcontroller 82 is typically designed to be the most durable component of the GBC module 76. In particular, the microcontroller 82 has a power rating and temperature rating that are different from other components, and it prioritizes its operations over the other components. It may monitor temperature, voltages, and the like to ensure proper operations. In the event that a component is malfunctioning, the microcontroller 82 operates to shut down the malfunctioning component and notify a local operator about the malfunctioning component via any suitable communication channel available to the MBS 10.

The microcontroller 82 is coupled to at least one microprocessor 84 (e.g., four Intel Atom x86 processors), which is operable to execute instructions read from memory 88. For example, application or operating system software (e.g., software 90) such as Linux OS executed by the microprocessor 84 may be stored in and read from the memory 88. The microprocessor 84 is also connected to an Ethernet switch 86 for controlling Ethernet connectivity.

The board connector 80 physically connects the GBC module 76 and the RF module 78. Communication interfaces between the RF module 78 and GBC module 76 may include, for example and without limitation, Ethernet, USB2, USB3, PCI-E, GPIOs, and control bits.

The GBC module 76 includes power circuitry 92 coupled to connectors to obtain and/or supply power. As shown, the connectors include the 5-pin connector 68-5 and the two RJ45 connectors (RJ-1 connector 68-3 and RJ-2 connector 68-4). The 5-pin connector 68-5 may be coupled to DC, solar, and external battery power sources. The RJ-1 connector 68-3 may be coupled to a power device to receive power (PoE), and the RJ-2 connector 68-4 may be coupled to power source equipment to output power (PoE) to an external device.

The GBC module 76 also includes charge control (QC) and uninterrupted power supply (UPS) circuitry 94. The GBC module 76 may optionally include an internal battery 96 (e.g., a lithium ion battery). As such, for example, the GBC module 76 may include two charge controllers: one for the internal battery 96 and the other for the external battery. The GBC module 76 also optionally includes power bridge circuitry 98 used to switch between power sources in accordance with policies, hierarchical rules, and/or circumstances.

The GBC module 76 can auto-detect if the internal battery 96 is installed. The internal battery 96 can provide backup power for a limited period of time (e.g., 45 to 60 minutes), allowing the microcontroller 82 to maintain housekeeping and monitoring operations when other power sources are depleted or have failed. As such, the power bridge circuitry 98 can switch the GBC module 76 to consume power from the internal battery 96.

The power bridge circuitry 98 provides several layers of backup power to maintain an UPS, as discussed further below. In some embodiments, a local operator can specify the hierarchical rules for automatically switching power sources in the event that another power source is depleted or fails.

In some embodiments, the light status system of the MBS 10 may signal (i) the state of a power source (e.g., internal battery 96) and/or (ii) a remaining period of operation (e.g., 30 minutes until the internal battery 96 is depleted). The light status system of the MBS 10 allows a local operator to diagnose this problem and find an alternate power source. For example, the MBS 10 could signal that the solar panel is malfunctioning to prompt the local operator to fix the solar panel.

As shown, the GBC module 76 may also include a synchronization ("sync") component 100, GSM module 102 (or any suitable communications module such as an LTE module 102), and/or OOBCCs 104, which are discussed in further detail below. The GBC module 76 may include other components known to persons skilled in the art but not shown or discussed herein for brevity, and may, in some embodiments, not include all the components shown.

In some embodiments, the MBS 10 may notify a remote server or service (e.g., cloud-based server or service) of the status of the MBS 10. For example, the microcontroller 82 may detect an event and notify the microprocessor 84 about the event. The microprocessor 84 may utilize the Ethernet switch 86 to notify the remote server or service via an RJ45 connector.

As indicated above, the MBS 10 includes several layers of power sources to provide an UPS. The power sources are connected to the MBS 10 via physical power connectors 68. These connectors include the RJ45 connectors 68-3 and 68-4 (i.e., ports), the 5-pin connector 68-4 for external power sources, and a second connector for the internal battery 96. The RJ45 connectors 68-3 and 68-4 and 5-pin connector 68-5 are panel mounted on the interface 52 of the MBS 10.

The first RJ45 connector (RJ-1 connector 68-3) can act to receive PoE from both data pair and spare pair components. The second RJ45 connector (RJ-2 connector 68-4) can act as Power Source Equipment (PSE) to supply PoE to external devices. This functionality allows the MBS 10 to form a daisy chain configuration with other MBSs or a backhaul device (e.g., CTOS long-distance Wi-Fi), run other devices (e.g., phone chargers), or the like.

The 5-pin connector 68-5 includes the following pins:

| | |
|---|---|
| PIN 1 | Solar+/AUX+ |
| PIN 2 | Solar−/AUX− |
| PIN 3 | External BATT+ |
| PIN 4 | External BATT− |
| PIN 5 | External BATT NTC |

In the example embodiment shown, two pins are dedicated to a solar or auxiliary (AUX) power source. As such, these pins provide either AUX power input or will be connected to solar power. The solar voltage of the solar power may, for example, be a maximum of 28V (e.g., range of 5 to 28V), and the AUX voltage may, for example, be nominal 24V+/−15%. The solar cells providing the solar power may be of 36-cells type. They can have an open circuit voltage of 21-23V and a maximum voltage of approximately 17-18V. The remaining three pins are dedicated to an external battery. The external battery could be a standard lead acid battery at a voltage of 12V, of around 65 Ah capacity.

The connector for the internal battery 96 includes INT BATT+, INT BATT−, and NTC contacts. The internal battery 96 may be a lithium polymer battery at a voltage of 12.6V, of around 2.7 Ah capacity.

A toggle switch (e.g., power button 66) can be used to power off the MBS 10. In some embodiments, when the power button 66 is in the OFF position, there will be zero or near-zero power drain on the batteries because the MBS shuts down regardless the state of batteries.

Figure 27:
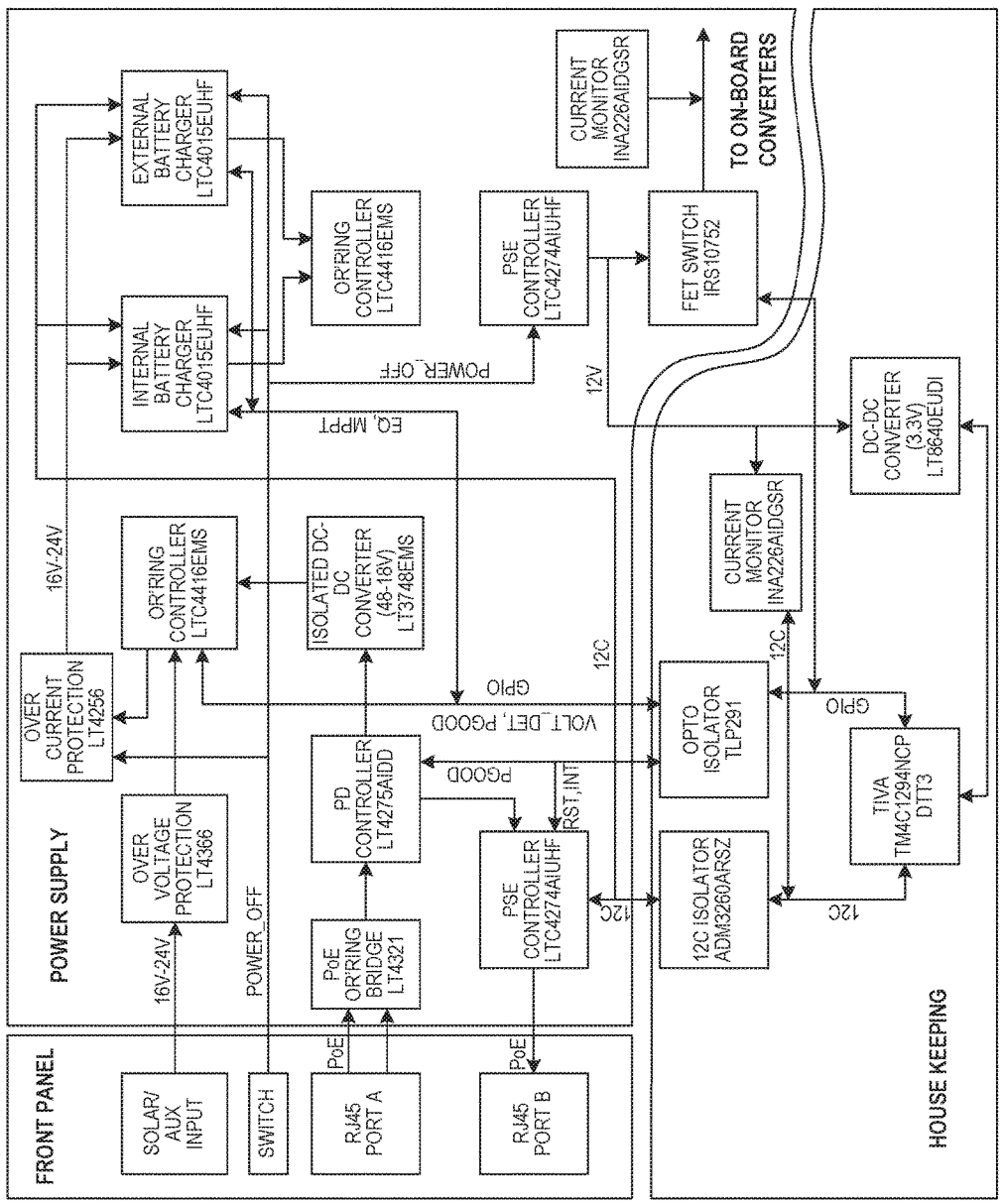
FIG. 27 is a block diagram of a front panel, power supply, and housekeeping microcontroller of the GBC board according to some embodiments of the present disclosure.
Figure 28:
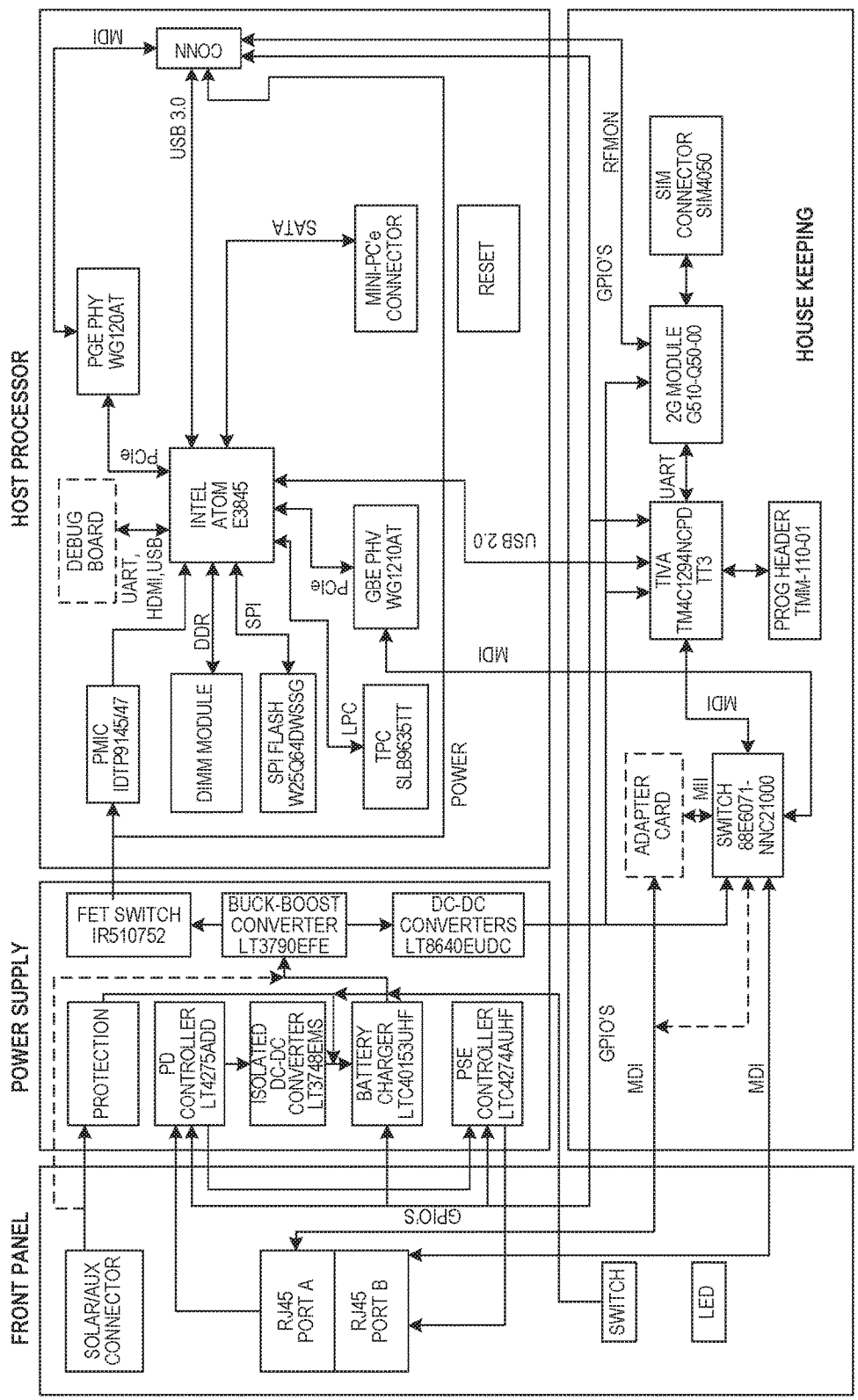
FIG. 28 is a block diagram of the front panel, the power supply, the host processor, and the housekeeping microcontroller of the GBC board according to some embodiments of the present disclosure.

The MBS 10 may include power-related circuitry as shown in FIGS. 27 and 28, which are block diagrams that show details of example power-related circuitry coupled to components of the MBS 10. In particular, FIG. 27 is a block diagram of an example of a front panel, power supply, and microcontroller 82 of the GBC module 76. FIG. 28 is a block diagram of an example of the front panel, the power supply, the host processor, and the microcontroller 82 of the GBC module 76.

The power-related circuitry is operable to provide hierarchical power switching. For example, FIG. 29 is a table that represents an example of a possible hierarchy of rules for switching between power sources to feed a load and charge internal and external batteries. As such, the power circuitry has an internal "OR-ing" configuration.

As shown in this example, both internal and external batteries are charged only when the power source is AUX or Solar. If the power source is PoE, however, the external battery charging is kept off and only the internal battery is charged. Specifically, the GBC module's microcontroller 82 obtains the information indicating whether a PoE/AUX source is available and controls charging of the external and internal batteries accordingly.

In some embodiments, the charging current and/or adapter current could be changed and set dynamically based on temperature conditions. This setup would help to, for example, minimize the dissipation of heat by the MBS 10 by controlling how much charging current goes to the external and internal batteries.

The OOBCCs 104 provide alternate ways to communicate with a remote server or service in the event that the backhaul fails. The OOBCCs 104 may include a satellite modem that utilizes short burst data to communicate events or the status of the MBS 10 with the remote service or server. These communications may be bidirectional. As such, a remote service can reliably access the MBS 10 to determine its state and status.

In some embodiments, the remote server or service can utilize the OOBCCs 104 to perform control operations on the MBS 10. For example, in the event of a security breach, a remote service can remotely erase subscriber data recorded in memory 88 of the MBS 10 and/or shutdown components. The remote service can utilize the OOBCCs 104 to perform these control operations.

In various embodiments, various power sources can be selected in a priority order when available. As an example, solar power can be prioritized over generator power, which can be prioritized over battery power. Thus, for example, the most efficient currently available power source can be used to provide continuous power to the base station.

The MBS 10 may optionally include a GSM or LTE module that provides a third way to route the RF in addition to the internal antenna 38 and external antenna. For example, the GSM or LTE module communicates with a local SIM card to allow a remote service to perform a full local loop back to diagnose the MBS 10, update a patch, resolve billing issues, and the like. In addition, the GSM or LTE module can communicate with other MBSs. As such, for example, a remote service can perform full diagnoses of multiple MBSs via a single MBS.

Accordingly, a remote server or service can diagnose events that occurred at the MBS 10 or other devices that communicate with the MBS 10. For example, the MBS 10 may be linked to a very-small-aperture terminal (VSAT). In the event that the MBS 10 is experiencing a communications failure, a remote server can send a command to the MBS 10 (e.g., via a satellite), which can respond that the MBS 10 is operational but the VSAT is malfunctioning. The remote server can then send a message to the local operator that indicates this information and explains the process for troubleshooting. In addition, the remote server can monitor the location of the MBS 10 by using the MBS 10's local GPS measurements.

The GBC module 76 may also optionally include a synchronization component 100. The sync component 100 may be another modular component (e.g., separate circuit board) that may be separate from the MBS 10. The sync component 100 may support multiple protocols with one standard interface. It may include a GPS subsystem, a high-end oscillator, and various other components (e.g., 1PPS, IEEE/588 (PTP), and OCX). In some embodiments, the sync component 100 may include the OOBCCs 104 (which includes the short-burst-data satellite modem, e.g., Iridium—to communicate with remote servers and local long range communication (e.g., LoRa) to communicate with a local operator).

Referring back to FIGS. 24 and 25, the RF module 78 includes components for performing operations related to radio functions. For example, the RF module 78 includes a digital front end, an analog front end, power amplifiers, duplexers, and various other components known to persons skilled in the art but not discussed herein for brevity.

The MBS 10 can operate as a GSM, LTE, or any other type of base station depending on the type of RF module utilized. In some embodiments, an RF module may be provided by a third-party vendor and may be readily integrated into the MBS 10. The RF module 78 may include a Software Defined Radio (SDR) and RF System on a Chip (SoC) for GSM, LTE, or any other RF technology. Each type of RF module may be connected to the same or its own corresponding GBC module, in the same or different MBSs. As such, for example, the RF module 78 of the MBS 10 may be shared with other MBSs that may not have their own RF modules.

In some embodiments, the RF module 78 has a quad-band front end (i.e., includes a quad-band power amplifier) to support all bands (e.g., at 850, 900, 1800, and 1900 MHz). The RF module 78 may include sensors to monitor various components and, to maintain RF operations, may automatically switch between components in the event that any of the components fails. For example, the RF module 78 may include a transceiver or pair of transceivers (TRX) for the low band and a TRX or pair of TRX for the high band. The low band includes frequencies of 850-900 MHz and the high band includes those of 1800-1900 MHz. Each TRX has four amplifiers. The low band TRX operates using two amplifiers, and the high band TRX operates using two amplifiers. As such, if a low band amplifier fails, for example, the RF board can switch to the high band or the low band can operate using the remaining low band amplifiers.

The entire quad-band amplifier may be divided into a number of smaller RF power amplifiers (e.g., 8 smaller RF power amplifiers), rather than the conventional single, large power amplifier. The smaller amplifiers provide redundancy in the event of the failure of any of the smaller amplifiers. Moreover, the smaller RF amplifiers are configurable for a particular band. For example, four amplifiers could be utilized for the same band, two different bands could operate at the same time, etc.

The RF module 78 may also include TDMA slot-level duty cycling technology. Specifically, in the GSM slot, an amplifier will be shut down depending on whether or not there is traffic. This may reduce power consumption by each amplifier that is cyclically shut down. For example, when the RF module 78 goes into the duty cycle mode, the entire base station may consume only about 15 watts.

Figure 30:
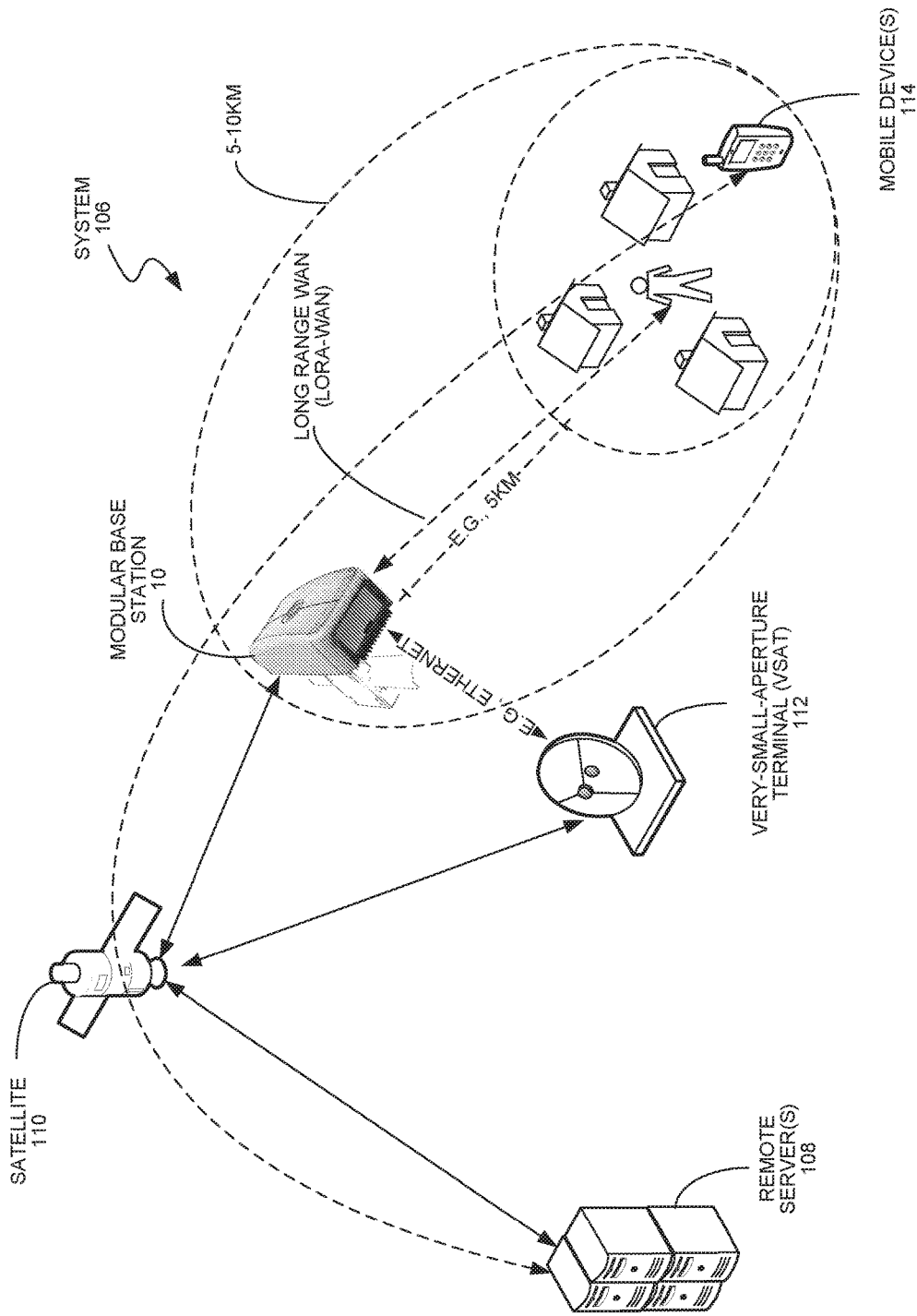
FIG. 30 is a system diagram depicting communications between servers and a mobile device via the MBS according to some embodiments of the present disclosure.

FIG. 30 is a system diagram showing an example of an implementation of the MBS 10 to provide communications between remote servers and mobile devices. As shown, the system 106 includes the MBS 10, remote servers 108, an orbiting satellite 110, a VSAT 112, and one or more mobile devices 114. These components are interconnected over one or more network links. For example, the orbiting satellite 110, VSAT 112, and the MBS 10 are network nodes that form links between mobile devices 114, and between the remote servers 108 and the mobile devices 114.

The networks of the system 106 may include any combination of private, public, wired, or wireless portions. The data communicated over the networks may be encrypted or unencrypted at various locations or along different portions of the networks. Each component of the system 106 may include combinations of hardware and/or software to process data, perform functions, communicate over the networks, and the like. For example, any component of the system 106 may include a processor, memory or storage, a network transceiver, a display, an operating system and application software (e.g., for providing a user interface), and the like. Other components, hardware, and/or software included in the system that are well-known to persons skilled in the art are not shown or discussed herein for brevity.

As detailed above, the MBS 10 is a relatively small, self-contained, portable device that is mountable on poles, trees, or the like. Further, the MBS 10 can provide cellular coverage to regions that may otherwise lack conventional cellular infrastructure. For example, as shown in FIG. 30, the MBS 10 is 5 kilometers from a village that includes a number of households. The MBS 10 provides coverage that, for example, has a range of 5-10 kilometers, which covers the households in the village. As such, the MBS 10 allows the users of the mobile devices 114 to communicate with each other and/or with the remote servers 108.

The remote servers 108 may include any number of server computers operable to communicate with the mobile device 114 via the MBS 10 (or OOBCCs). In some embodiments, the remote servers 108 provide a network portal (e.g., website or other communication channel) that allows the mobile devices 114 to access data. In some embodiments, the remote servers 108 can remotely control, monitor, diagnose, and troubleshoot the MBS 10.

The mobile device 114 may be used by a user to interact with the system. Examples of the mobile device 114 include a smartphone (e.g., Apple iPhone, Samsung Galaxy, Nokia Lumina), a feature phone (e.g., Nokia brick phone), tablet computer (e.g., Apple iPad, Samsung Note, Amazon Fire, Microsoft Surface), computer (e.g., Apple MacBook, Lenovo 440), and any other device that is capable of communicating via the system 106.

As shown, information can be communicated in a bidirectional manner between the MBS 10 and the remote servers 108. As such, the remote servers 108 (e.g., telecom operator or whoever is managing and/or monitoring the MBS 10) can communicate the information to a local operator of the MBS 10.

The MBS 10 may include one or more interfaces for communicating over a local network with a local device. In particular, the MBS 10 may also provide or utilize a Wi-Fi or Long-range WAN (LoRA-WAN) interface as a secondary way to communicate with local devices and/or the remote servers 108. For example, the MBS 10 may utilize Wi-Fi or LoRA-WAN to establish a local connection with the VSAT (i.e., a two-way satellite ground station with a small dish antenna) to communicate with the remote servers 108 via the orbiting satellite 110. As such, the MBS 110 can still communicate with the remote servers 108 in the event that a radio of the MBS 10 is malfunctioning.

In some embodiments, the MBS 10 may establish a connection with a device of a local operator over a Wi-Fi network or LoRA-WAN for troubleshooting purposes. Wi-Fi typically has a limited range under 200 meters. In contrast, the LoRA-WAN interface has a broader range. For example, as shown in FIG. 30, the LoRA-WAN may have at least the same range as the base station coverage area (e.g., 5-10 km). However, use of the LoRA-WAN interface would require a dongle attached to a mobile device of the local operator.

Figure 31:
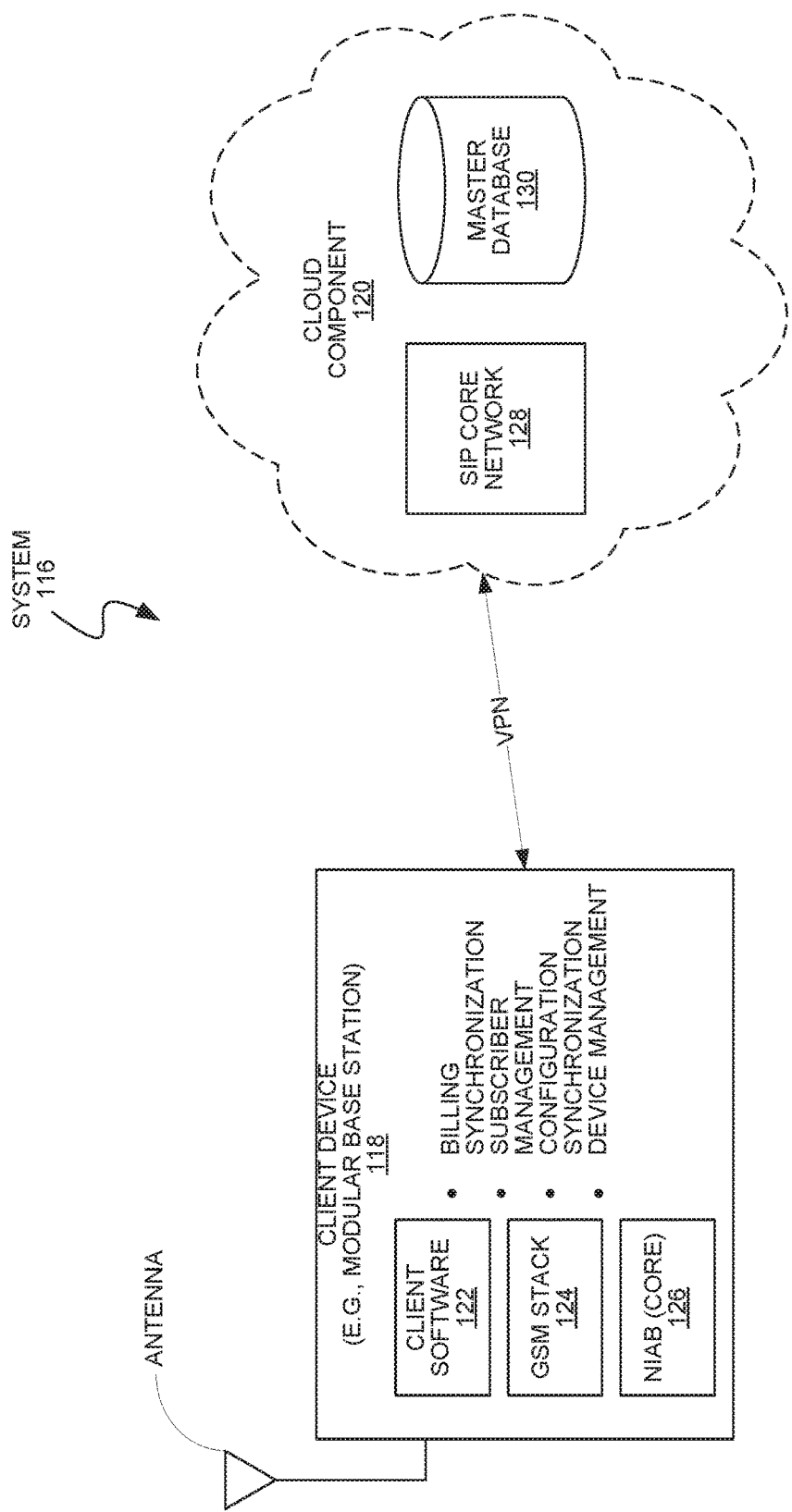
FIG. 31 is a block diagram depicting a client device interacting with a cloud component according to some embodiments of the present disclosure.

In some embodiments, the software design of the MBS can include any of the following features:
BSS—PHYS|L1|L2|L3 . . .
Client API
Linux
Out-of-band Channel
Driver
BIOS Bootloader
BTS-RTOS—ConFIG.|Monitor|Alarm A cloud-based system could be utilized to synchronize one or more MBSs located at different sites. For example, FIG. 31 is a block diagram of an example of a cloud-based system 116 including a client device 118 (which may be, for example and without limitation, an MBS 10, or may be a different suitable device) interacting with a cloud-based component 120. As shown, the client device 118 communicates over a virtual private network (VPN) with the cloud component 120 (e.g., remote servers 108 and associated software). A cloud interconnect (not shown) may connect the cloud component 120 to a public telephone network, VoIP network, messenger, carrier network, or the like (which allows a user to make calls or perform other communications). In some embodiments, a web interface (not shown) is provided for configuring components of the cloud-based system 116.

The client device 118 illustrated here may include client software 122, a GSM or LTE stack 124, and a network-in-a-box (NIAB) core 126. As such, the client device 118 can operate as a base station system (BSS), which corresponds to a base transceiver station (BTS) and base station controller (BSC) of a GSM network. The cloud component 120 includes a standard SIP core network 128 and a master database 130 of all subscriber information, usage information, billing data, and the like.

The client software 122 may be stored in memory (in the case of client device 188 being MBS 10, in memory 88) and executes on a microprocessor ((in the case of client device 188 being MBS 10, in microprocessor 84) to communicate with the NIAB core 126. The client software 122 may perform operations related to billing synchronization, subscriber management, configuration synchronization, device management (e.g., determines operations of services at particular times), and the like, with the cloud component 120.

This is commonly referred to as visitor location register (VLR) and may be included with every client device 118 to allow for local switching with all calls and SMS, and can perform these operations for data as well, for example, by placing the data onto the Internet instead of the SIP core network 128.

Figure 32:
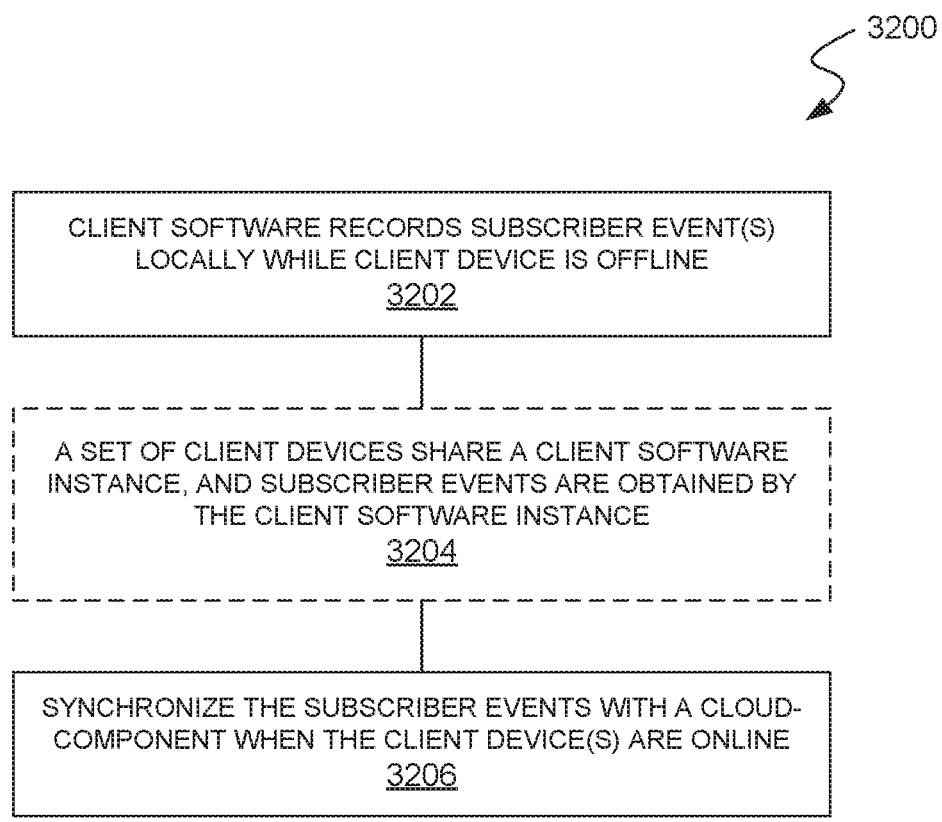
FIG. 32 is a flowchart for synchronizing one or more client devices with a cloud component according to some embodiments of the present disclosure.

These operations may occur online and/or offline. For example, FIG. 32 is a flowchart showing an example of a process 3200 performed by the client device 118 for synchronizing subscriber events with the cloud component 120. In step 3202, the client software 122 of the client device 118 records one or more subscriber events locally while the client device 118 is operating in an offline mode. Optionally, in step 3204, a set of client devices including the client device 118 share an instance of the client software 122 that obtains subscriber events from the set of client devices. Lastly, in step 3206, the client software instance 122 synchronizes the subscriber events with the cloud component 120 after the client device 118 is back in an online mode.

Some events that occur at the client device 118 do not require immediate synchronization with the master database 130. For example, local calls may proceed without interacting with the cloud component 120, in the event that the VPN is offline. Once the VPN is back online, a log could be sent to the cloud component 120, and the client device 118 could be synchronized with the master database 130.

For example, the client device 118 may cache an entire subscriber database to support local offline operations for billing and subscriber management. This includes operations that would normally (e.g., in online mode) be sent to the remote SIP core network 128. As a result, the client device 118 can support certain functions offline that do not require an immediate interaction or check with the cloud component 120, including offline local calls, subscriber mobility, and registration of new subscribers. This reduces an amount and/or frequency of synchronization between the client device 118 and the remote SIP core network 128.

Some events that occur at the client device 118 require subsequent synchronization with the master database 130. For example, the client device 118 may need to check with the master database 130 to confirm that a phone number is available before registering a new subscriber. As such, the client device 118 may use API calls for the cloud component 120 to perform the subsequent synchronization during an online mode.

A data structure allows the client device 118 to perform local updates while offline and synchronize to the cloud component 120 later, and/or possibly through a peer-to-peer (P2P) network, when online. In some embodiments, every minute, every call or SMS, and the like is handled and routed in this same way.

In some embodiments, each event at each client device 118 is logged locally with an associated sequence number. The cloud component 120 tracks the highest sequence number that it receives from each and every client device. This information can be used in the event that communications are cut off, allowing the cloud component to track what events it has already seen (based on their associated sequence numbers). The sequence numbers allow the cloud component 120 to subsequently ignore events that have already been received and/or reviewed. The cloud component 120 can also monitor the VPN state to detect a downed link. In some embodiments, the cloud component 120 may also enforce access rights to limit users in accordance with their subscriptions.

Figure 33:
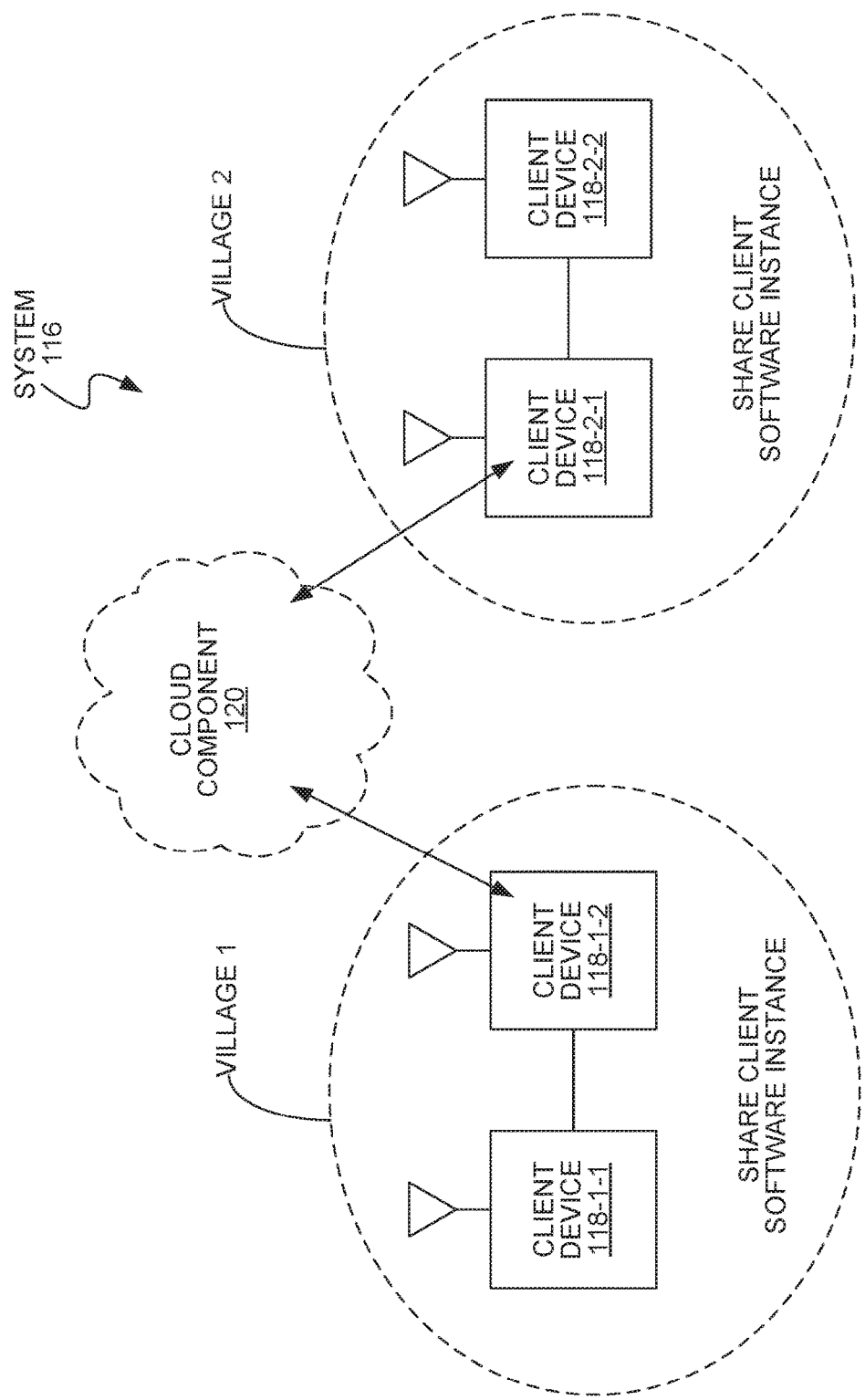
FIG. 33 is a block diagram depicting multiple sets of client devices each having a common base station component (e.g., client software instance) according to some embodiments of the present disclosure.

In some embodiments, two or more (e.g., a group or set) of client devices 118 utilize a single instance of the client software 122. The single shared client software instance coordinates the states of a set of client devices. For example, FIG. 33 is a block diagram depicting an example of two sets of client devices 118 whereby each set has a common base station component (i.e., shared client software instance).

However, billing information may not be synchronized across multiple sets of client devices 118 or within a single set that has multiple instances of the client software 122. As such, synchronization may be required between the multiple instances of the software 122 within a set or across sets (which may have one or more instances of the software 122 per set) and the cloud component 120. The synchronization process across multiple sets may in some instances be similar to the process for a single client device or multiple client devices, as detailed above. Billing and subscription services may be generally handled offline at the edge of a network (at client devices 118) and then synchronized to the cloud component 120 when the client devices 118 are back online.

Figure 34:
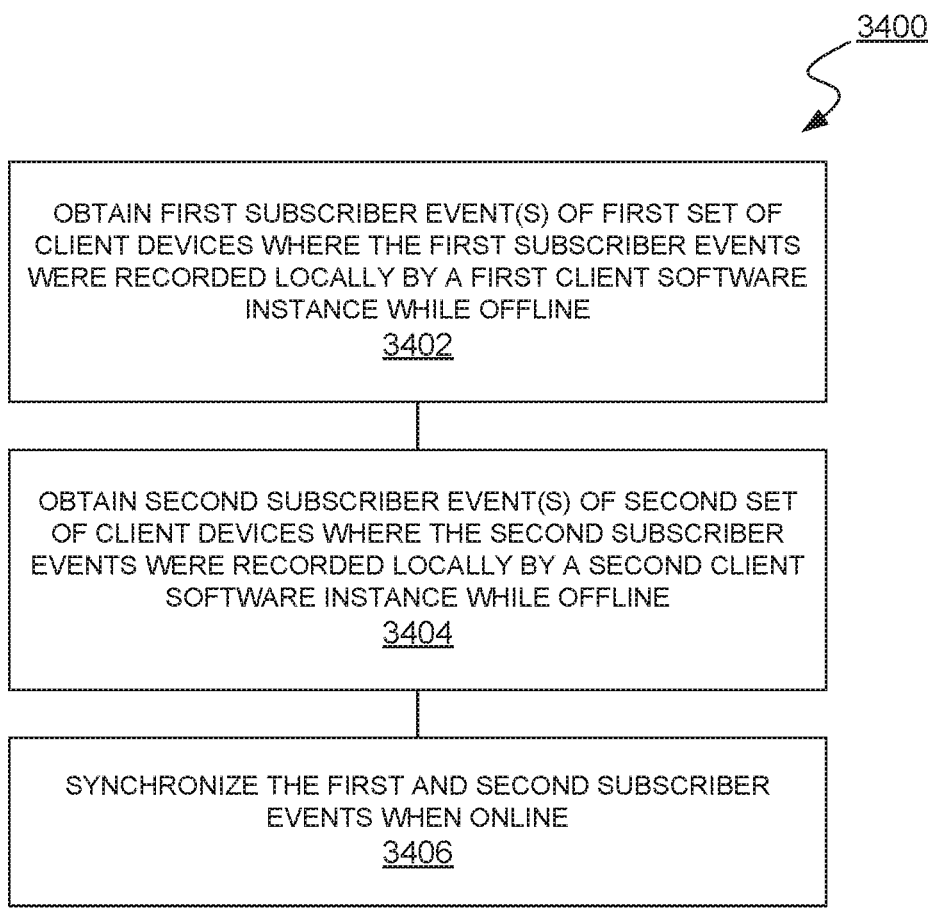
FIG. 34 is a flowchart for synchronizing sets of client devices with the cloud component according to some embodiments of the present disclosure.

FIG. 34 is a flowchart showing an example of a process 3400 performed by the cloud component 120 for synchronizing sets of client devices 118. In step 3402, the cloud component 120 obtains first subscriber events of a first set of client devices 118. The first subscriber events were recorded locally by a first shared client software instance while in an offline mode. In step 3404, the cloud component 120 obtains second subscriber events of a second set of client devices 118. The second subscriber events were recorded locally by a second shared client software instance while in an offline mode. Lastly, in step 3406, the cloud component 120 synchronizes the first subscriber events and the second subscriber events after going back in an online mode.

In particular, the client devices 118 of a set may each have uplinks, so any client device could be the master and/or perform a switchover to synchronize with the cloud component 120. In some embodiments, the cloud component 120 can detect which client device 118 per set handles these operations. At any time, any client device 118 in a set can be used to synchronize with the cloud component 120 because there is only one source of truth per set. As such, the use of one active client software instance within a set avoids the need for synchronization within a single set of client devices 118.

Synchronization to the cloud component 120 may be optional when a client device 118 can process calls directly with a VoIP provider. In addition, each client device 118 could include a number printed on a side of the device to facilitate installation and setup by non-technical users. For example, this number could be entered into a website to automatically initialize the VPN and sync for the client device 118.

Figure 35:
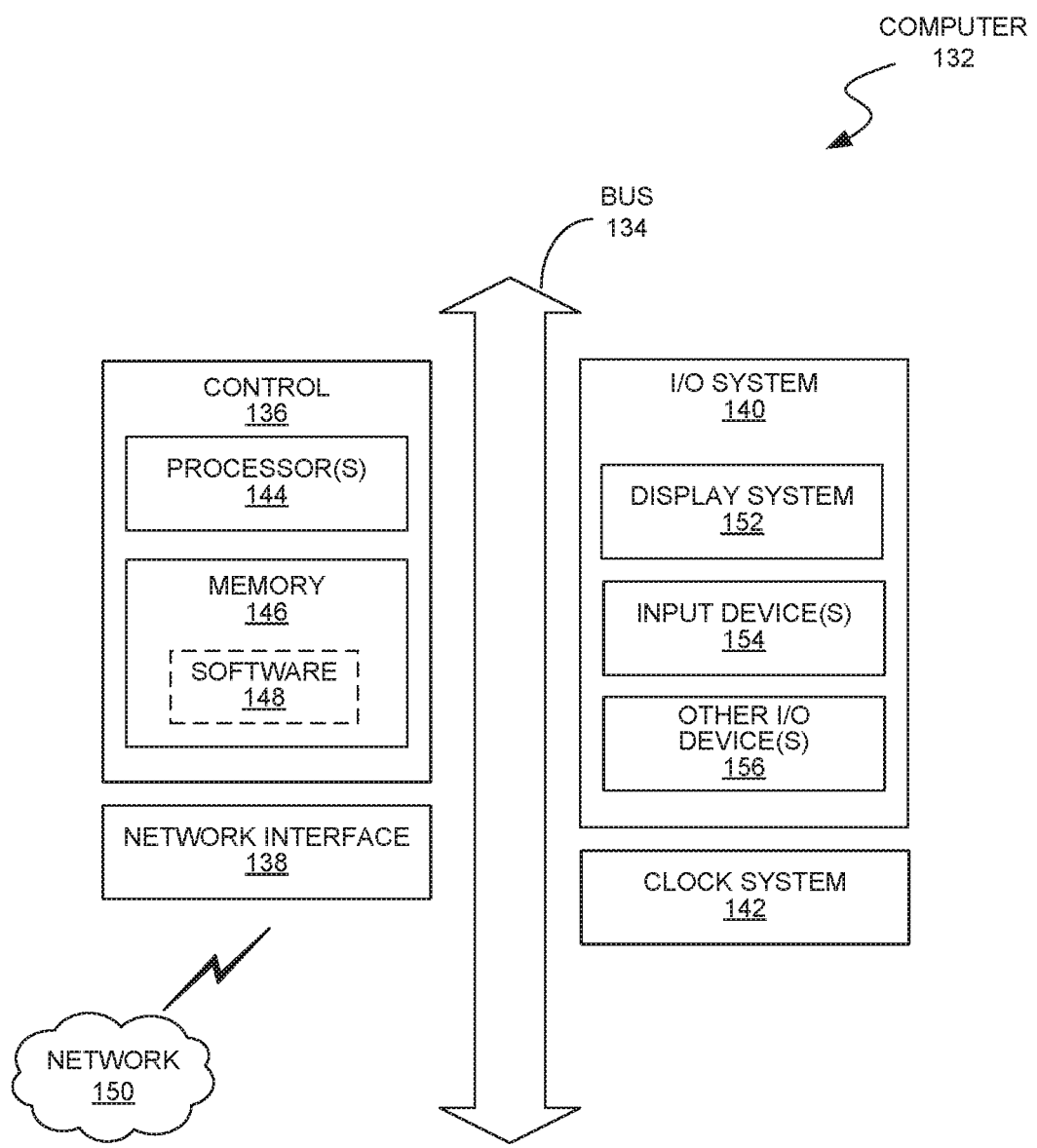
FIG. 35 is a block diagram of a computer operable to implement the disclosed technology according to some embodiments of the present disclosure.

FIG. 35 is a block diagram of an example computer 132 operable to implement aspects of the disclosed technology according to some embodiments of the present disclosure. For example, components of the disclosed systems may include a generic computer or a computer specifically designed to carry out features of the disclosed technology. For example, the components may include a system-on-chip (SOC), a single-board computer (SBC) system, a desktop or laptop computer, a kiosk, a mainframe, a mesh of computer systems, a handheld mobile device, or combinations thereof.

The computer 132 may be a standalone device or part of a distributed system that spans multiple networks, locations, machines, or combinations thereof. In some embodiments, the computer 132 operates as a server computer or a client device in a client-server network environment, or as a peer machine in a peer-to-peer system. In some embodiments, the computer 132 may perform one or more steps of the disclosed embodiments in any order, in real time, near real time, offline, by batch processing, or combinations thereof.

As shown, the computer 132 includes a bus 134 operable to transfer data between hardware components. These components include a control 136 (i.e., processing system), a network interface 138, an input/output (I/O) system 140, and a clock system 142. The computer 132 may include other components not shown nor further discussed for the sake of brevity. One having ordinary skill in the art will understand any hardware and software included but not shown in FIG. 35.

The control 136 includes one or more processors 144 (e.g., central processing units (CPUs), application-specific integrated circuits (ASICs), and/or field-programmable gate arrays (FPGAs)) and memory 146 (which may include software). The memory 146 may include, for example, volatile memory such as random-access memory (RAM) and/or non-volatile memory such as read-only memory (ROM). The memory 146 can be local, remote, or distributed.

A software program 148, when referred to as "implemented in a computer-readable storage medium," includes computer-readable instructions stored in a memory. A processor is "configured to execute a software program" when at least one value associated with the software program is stored in a register that is readable by the processor. In some embodiments, routines executed to implement the disclosed embodiments may be implemented as part of the operating system (OS) software (e.g., Microsoft Windows®, Linux®) or a specific software application, component, program, object, module or sequence of instructions referred to as "computer programs."

As such, the computer programs typically comprise one or more instructions set at various times in various memory devices of a computer and which, when read and executed by at least one processor, cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium.

The network interface 138 may include a modem or other interfaces (not shown) for coupling the computer 132 to other computers over a network 150. The I/O interface 140 may operate to control various I/O devices, including peripheral devices such as a display system 152 (e.g., a monitor or touch-sensitive display) and one or more input devices 154 (e.g., a keyboard and/or pointing device). Other I/O devices 156 may include, for example, a disk drive, printer, scanner, or the like. Lastly, the clock system 142 controls a timer for use by the disclosed embodiments.

Operation of a memory device (e.g., memory 146), such as a change in state from a binary one to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms, and that the disclosure applies equally regardless of the particular type of machine or computer-readable media used to actually effect the distribution.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A modular base station comprising:
   an outer enclosure configured to interface with an external environment;
   an inner enclosure comprising circuitry configured to perform network operations, wherein the inner enclosure is enclosed by the outer enclosure and sealed from the external environment;
   one or more antennas enclosed by the outer enclosure and external to the inner enclosure, wherein the one or more antennas are communicatively coupled to the circuitry of the inner enclosure and enable wireless communications;
   a perforated mesh of the outer enclosure, wherein the perforated mesh is permeable to fluid from the external environment; and
   a removable antenna plate configured to be placed on the modular base station, wherein the one or more antennas are configured to:
      operate as one or more omni antennas while the removable antenna plate is not placed on the modular base station, and
      operate as one or more directional antennas while the removable antenna plate is placed on the modular base station.

2. The modular base station of claim 1, wherein the inner enclosure comprises:
   a modular general purpose computing circuit board; and
   a modular radio frequency circuit board connected to the modular general purpose computing circuit board via a single connector.

3. The modular base station of claim 1, comprising:
   a cavity formed by the outer enclosure, a wall of the inner enclosure, a door frame, and a door; and
   an interface in the cavity, wherein the interface comprises a plurality of connectors for connecting the circuitry of the modular base station to one or more external devices.

4. The modular base station of claim 3, wherein the door frame comprises:

a sloping recessed portion; and
a plurality of cable grooves adjacent to the sloping recessed portion.

5. The modular base station of claim 3, wherein the interface comprises:
one or more N-Type connectors;
one or more RJ45 connectors; and
a multi-pin power connector, wherein the one or more N-Type connectors are located closer to a center of the flat surface relative to the one or more RJ45 connectors and the multi-pin power connector.

6. The modular base station of claim 1, comprising power circuitry operable to switch from a first power source to a second power source in accordance with predetermined policies or a plurality of hierarchical rules.

7. The modular base station of claim 6, wherein the first power source and the second power source comprise any from a group consisting of:
auxiliary power;
solar power;
power over Ethernet;
battery power from a battery external to the modular base station; and
battery power from a battery internal to the modular base station.

8. The modular base station of claim 1, comprising out-of-band control channel circuitry operable to enable bidirectional communications with the modular base station in accordance with a wireless local area network protocol.

9. A modular base station comprising:
an outer enclosure configured to interface with an external environment;
an inner enclosure comprising circuitry configured to perform network operations, wherein the inner enclosure is enclosed by the outer enclosure and sealed from the external environment;
one or more antennas enclosed by the outer enclosure and external to the inner enclosure, wherein the one or more antennas are communicatively coupled to the circuitry of the inner enclosure and enable wireless communications;
a cavity formed by the outer enclosure, a wall of the inner enclosure, a door frame, and a door; and
an interface in the cavity, wherein the interface comprises
a plurality of connectors for connecting the circuitry of the modular base station to one or more external devices;
a plurality of light pipes embedded in a plurality of walls of the door frame; and
a plurality of lighting sections located along the door frame, wherein the light pipes channel light from the inner enclosure to the plurality of lighting sections.

10. The modular base station of claim 9, wherein the door frame comprises:
a sloping recessed portion; and
a plurality of cable grooves adjacent to the sloping recessed portion.

11. The modular base station of claim 9, wherein the interface comprises:
one or more N-Type connectors;
one or more RJ45 connectors; and
a multi-pin power connector, wherein the one or more N-Type connectors are located closer to a center of the flat surface relative to the one or more RJ45 connectors and the multi-pin power connector.

12. The modular base station of claim 9, wherein the inner enclosure comprises:
a modular general purpose computing circuit board; and
a modular radio frequency circuit board connected to the modular general purpose computing circuit board via a single connector.

13. The modular base station of claim 9, comprising power circuitry operable to switch from a first power source to a second power source in accordance with predetermined policies or a plurality of hierarchical rules.

14. The modular base station of claim 13, wherein the first power source and the second power source comprise any from a group consisting of:
auxiliary power;
solar power;
power over Ethernet;
battery power from a battery external to the modular base station; and
battery power from a battery internal to the modular base station.

15. The modular base station of claim 9, comprising out-of-band control channel circuitry operable to enable bidirectional communications with the modular base station in accordance with a wireless local area network protocol.

16. A modular base station comprising:
an outer enclosure configured to interface with an external environment;
an inner enclosure comprising circuitry configured to perform network operations, wherein the inner enclosure is enclosed by the outer enclosure and sealed from the external environment;
one or more antennas enclosed by the outer enclosure and external to the inner enclosure, wherein the one or more antennas are communicatively coupled to the circuitry of the inner enclosure and enable wireless communications;
one or more microprocessors comprised in a general purpose baseband computing circuit board; and
memory containing instructions executable by the one or more microprocessors whereby the modular base station is operable to:
perform cellular network operations in accordance with Long-Term Evolution (LTE) while an LTE Radio Frequency (RF) modular circuit board is coupled to the general purpose baseband computing circuit board; and
perform cellular network operations in accordance with Global System for Mobile communication (GSM) while a GSM RF modular circuit board is coupled to the general purpose baseband computing circuit board.

17. The modular base station of claim 16, comprising power circuitry operable to switch from a first power source to a second power source in accordance with predetermined policies or a plurality of hierarchical rules.

18. The modular base station of claim 17, wherein the first power source and the second power source comprise any from a group consisting of:
auxiliary power;
solar power;
power over Ethernet;
battery power from a battery external to the modular base station; and
battery power from a battery internal to the modular base station.

19. The modular base station of claim 16, comprising out-of-band control channel circuitry operable to enable bidirectional communications with the modular base station in accordance with a wireless local area network protocol.

20. The modular base station of claim 16, comprising:
a cavity formed by the outer enclosure, a wall of the inner enclosure, a door frame, and a door; and
an interface in the cavity, wherein the interface comprises a plurality of connectors for connecting the circuitry of the modular base station to one or more external devices.

* * * * *